US012585110B2

(12) United States Patent
Amitai

(10) Patent No.: US 12,585,110 B2
(45) Date of Patent: Mar. 24, 2026

(54) COMPACT HEAD-MOUNTED DISPLAY SYSTEM HAVING SMALL INPUT APERTURE AND LARGE OUTPUT APERTURE

(71) Applicant: OORYM OPTICS LTD., Rehovot (IL)

(72) Inventor: Yaakov Amitai, Rehovot (IL)

(73) Assignee: OORYM OPTICS LTD., Rehovot (IL)

( * ) Notice: Subject to any disclaimer, the term of this patent is extended or adjusted under 35 U.S.C. 154(b) by 482 days.

(21) Appl. No.: 18/019,473

(22) PCT Filed: Aug. 1, 2021

(86) PCT No.: PCT/IL2021/050930
§ 371 (c)(1),
(2) Date: Feb. 2, 2023

(87) PCT Pub. No.: WO2022/029764
PCT Pub. Date: Feb. 10, 2022

(65) Prior Publication Data

US 2023/0280593 A1 Sep. 7, 2023

(30) Foreign Application Priority Data

Aug. 3, 2020 (IL) .......................................... 276466

(51) Int. Cl.
*G02B 27/01* (2006.01)
*F21V 8/00* (2006.01)
*G02B 27/00* (2006.01)

(52) U.S. Cl.
CPC ....... *G02B 27/0081* (2013.01); *G02B 6/0018* (2013.01); *G02B 6/0035* (2013.01);
(Continued)

(58) Field of Classification Search
CPC .. G02B 6/0018; G02B 6/0035; G02B 6/0045; G02B 27/0081; G02B 27/0101; G02B 27/0123; G02B 27/0172
See application file for complete search history.

(56) References Cited

U.S. PATENT DOCUMENTS 10,551,544 B2 * 2/2020 Danziger ............... G02B 6/002
10,782,532 B2 * 9/2020 Amitai ..................... G02B 6/34
(Continued)

FOREIGN PATENT DOCUMENTS

CN 104597565 A * 5/2015 ......... G02B 27/0101
WO 2017141242 A2 8/2017
(Continued)

OTHER PUBLICATIONS

International Search Report and Written Opinion dated Oct. 2, 2022 in PCT International Patent Application No. PCT/IL2021/050930, 10 pages.

*Primary Examiner* — Daniel Petkovsek
(74) *Attorney, Agent, or Firm* — Snell & Wilmer LLP

(57) ABSTRACT

An optical device includes a first light-transmitting substrate having at least two parallel major surfaces, a light wave input aperture, a light wave output aperture positioned next to one of the major surfaces of the substrate, a light wave output pupil, a light wave input element for coupling light waves, having a field-of view and a central light wave, into the substrate to effect total internal reflection from the major surfaces of the substrate, and at least one reflecting surface, having an active area, and being located between the two major surfaces of the light-transmitting substrate, for coupling light waves out of the substrate, wherein light waves trapped inside the substrate are reflected at least twice by the active area of the reflecting surface before being coupled out from the substrate, are substantially reflected from one of the major surfaces between the first and the second reflectance (Continued)

from the reflecting surface, are then reflected from the reflecting surface and pass through the output aperture towards the output pupil. An optical device for transferring light waves is also provided.

14 Claims, 13 Drawing Sheets

(52) U.S. Cl.
CPC ....... *G02B 6/0045* (2013.01); *G02B 27/0101* (2013.01); *G02B 27/0172* (2013.01); *G02B 2027/0123* (2013.01)

(56) References Cited

U.S. PATENT DOCUMENTS

| | | | | |
|---|---|---|---|---|
| 11,092,810 | B2 * | 8/2021 | Danziger ............. | G02B 6/0028 |
| 11,112,610 | B2 * | 9/2021 | Kuno ................... | G02B 6/0031 |
| 2019/0212487 | A1 * | 7/2019 | Danziger ............. | G02B 6/0035 |

FOREIGN PATENT DOCUMENTS

| | | | |
|---|---|---|---|
| WO | 2019150461 | A1 | 8/2019 |
| WO | 2019224764 | A1 | 11/2019 |

* cited by examiner

COMPACT HEAD-MOUNTED DISPLAY SYSTEM HAVING SMALL INPUT APERTURE AND LARGE OUTPUT APERTURE

FIELD OF THE INVENTION

The present invention relates to substrate-based light wave guided optical devices, and particularly to devices which include reflecting surfaces carried by a light-transmissive substrate.

The invention can be implemented to advantage in a large number of imaging applications, such as, head-mounted and head-up displays, as well as cellular phones, compact displays, and 3-D displays.

BACKGROUND OF THE INVENTION

One of the important applications for compact optical elements is in head-mounted displays (HMDs), wherein an optical module serves both as an imaging lens and a combiner, in which a two-dimensional display is imaged to infinity and reflected into the eye of an observer. The display can be obtained directly from either a spatial light modulator (SLM), such as a cathode ray tube (CRT), a liquid crystal display (LCD), an organic light emitting diode array (OLED), a scanning source and similar devices, indirectly, by means of a relay lens, or an optical fiber bundle. The display comprises an array of elements (pixels) imaged to infinity by a collimating lens and transmitted into the eye of the observer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier and bulkier, and therefore, even for a moderate performance device, is impractical. Therefore, this is a major drawback for all kinds of displays but especially in HMDs, wherein the system should be as light and compact as possible.

The need for compactness has led to several different complex optical solutions, all of which, on the one hand, are still not sufficiently compact for most practical applications, and on the other hand, suffer major drawbacks in terms of manufacturability, price and performance.

The teachings included in International Patent Publication Numbers WO2017/141239, WO2017/141240, WO2017/141242, WO2019/077601, and WO2020/157747 are herein incorporated by reference.

SUMMARY OF THE INVENTION

The present invention facilitates the provision of compact substrates for, amongst other applications, HMDs. The invention allows relatively wide FOVs together with relatively large eye-motion box (EMB) values. The resulting optical system offers a large, high-quality image, which also accommodates large movements of the eye. The optical system according to the present invention is particularly advantageous because it is substantially more compact than state-of-the-art implementations, and yet it can be readily incorporated even into optical systems having various specialized configurations.

A broad object of the present invention is, therefore, to alleviate the drawbacks of state-of-the-art compact optical display devices and to provide other optical components and systems having improved performance, according to specific requirements.

In accordance with the present invention there is therefore provided an optical device, comprising a first light-transmitting substrate having at least two parallel major surfaces; an input aperture; an output aperture positioned next to one of the major surfaces of the substrate; an output pupil; an input element for coupling light waves, having a field-of view and a central light wave, into the substrate to effect total internal reflection from the major surfaces of the substrate, and at least one flat reflecting surface, having an active area, and being located between the two major surfaces of the light-transmitting substrate, for coupling light waves out of the substrate, wherein light waves trapped inside the substrate are reflected at least twice by the active area of the reflecting surface before being coupled out from the substrate, are substantially reflected from one of the major surfaces between the first and the second reflectance from the reflecting surface, are then reflected from the reflecting surface and pass through the output aperture directly towards the output pupil.

In accordance with the present invention there is further provided an optical device for transferring light waves, comprising a first light-transmitting substrate having at least two parallel major surfaces and at least one edge; an input aperture; an output aperture positioned next to one of the major surfaces of the substrate; an output pupil; an input surface for coupling light waves, having a first field-of view and a central light wave, into the substrate to effect total internal reflection from the major surfaces of the substrate, and at least one flat reflecting surface having an active area and being located between the two major surfaces of the light-transmitting substrate, for coupling light waves out of the substrate, wherein light waves coupled into the substrate through the input aperture substantially normal to the major surfaces of the substrate, are reflected at least twice by the input surface before being coupled into the substrate, and are substantially reflected from one of the major surfaces between the first and the second reflectance from the input surface.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for the purpose of illustrative discussion of the preferred embodiments of the present invention only and are presented to provide what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of a prior art exemplary light-transmitting substrate;

FIG. 2 is a side view of another prior art exemplary light-transmitting substrate;

FIGS. 3A and 3B illustrate desired reflectance and transmittance characteristics of selectively reflecting surfaces, used in a prior art exemplary light-transmitting substrate, for two ranges of incident angles;

FIG. 4 illustrates a reflectance curve as a function of the incident angle for an exemplary dielectric coating;

Figure 5A:
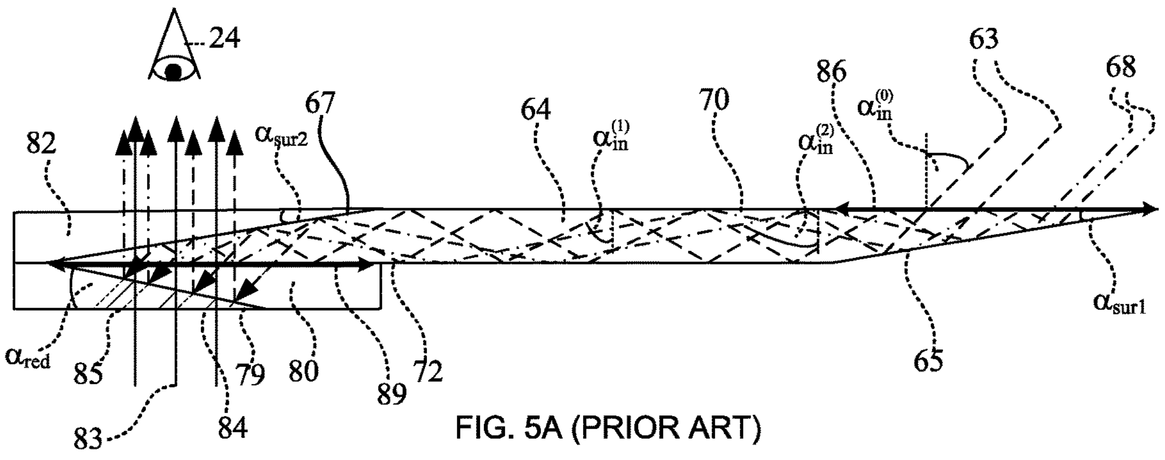
Figure 5B:
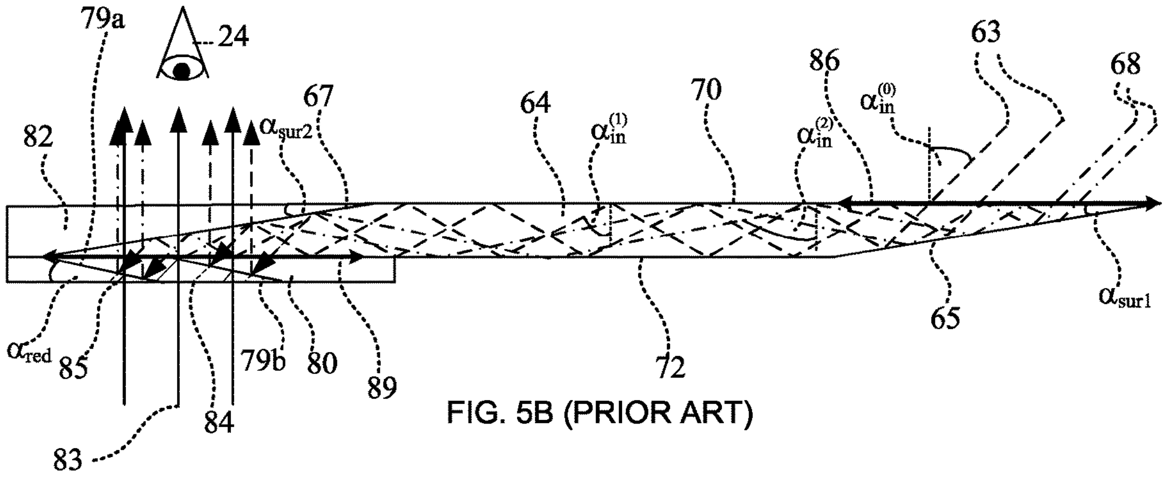
Figure 5C:
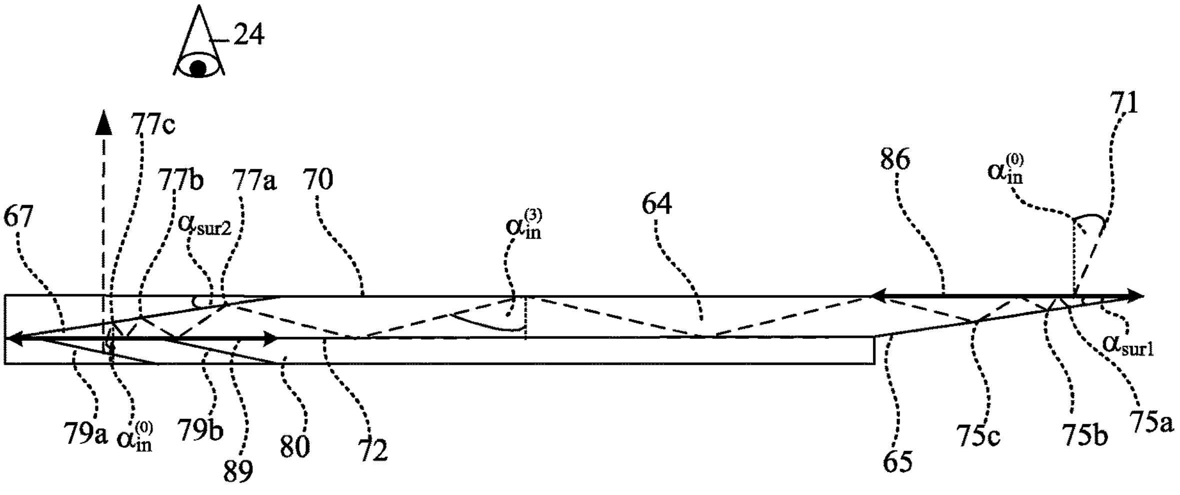
Figure 6A:
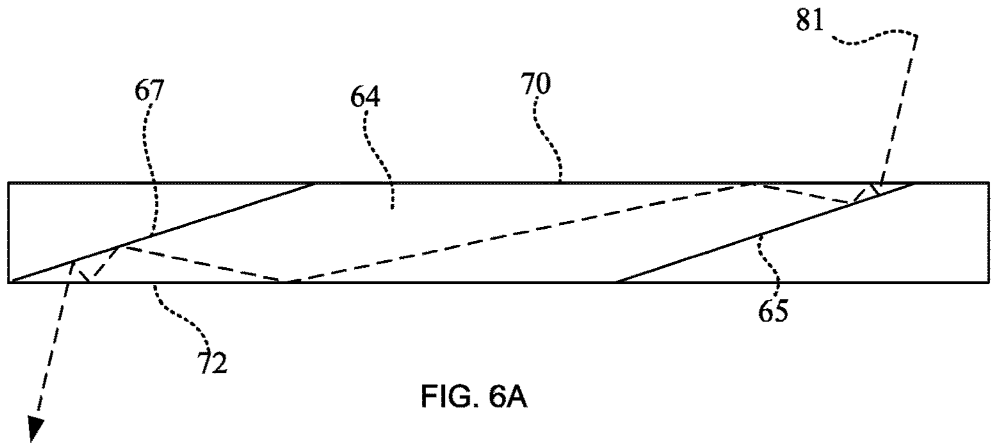
Figure 6B:
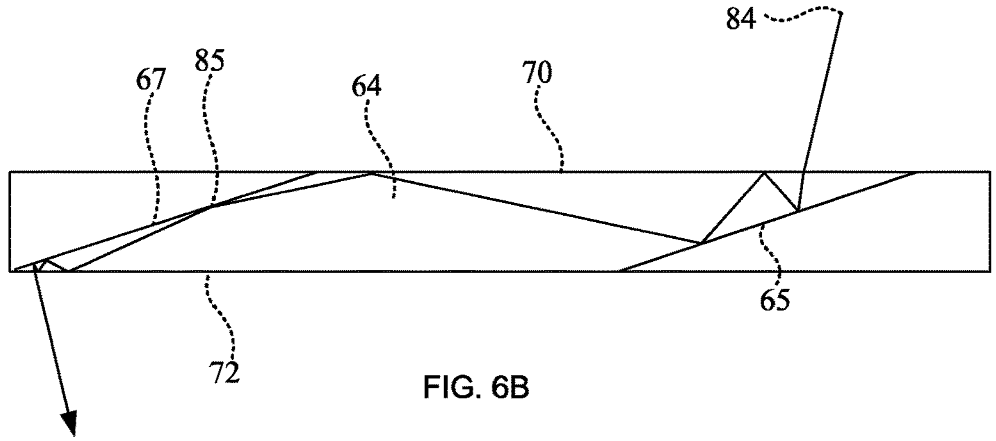
Figure 7:
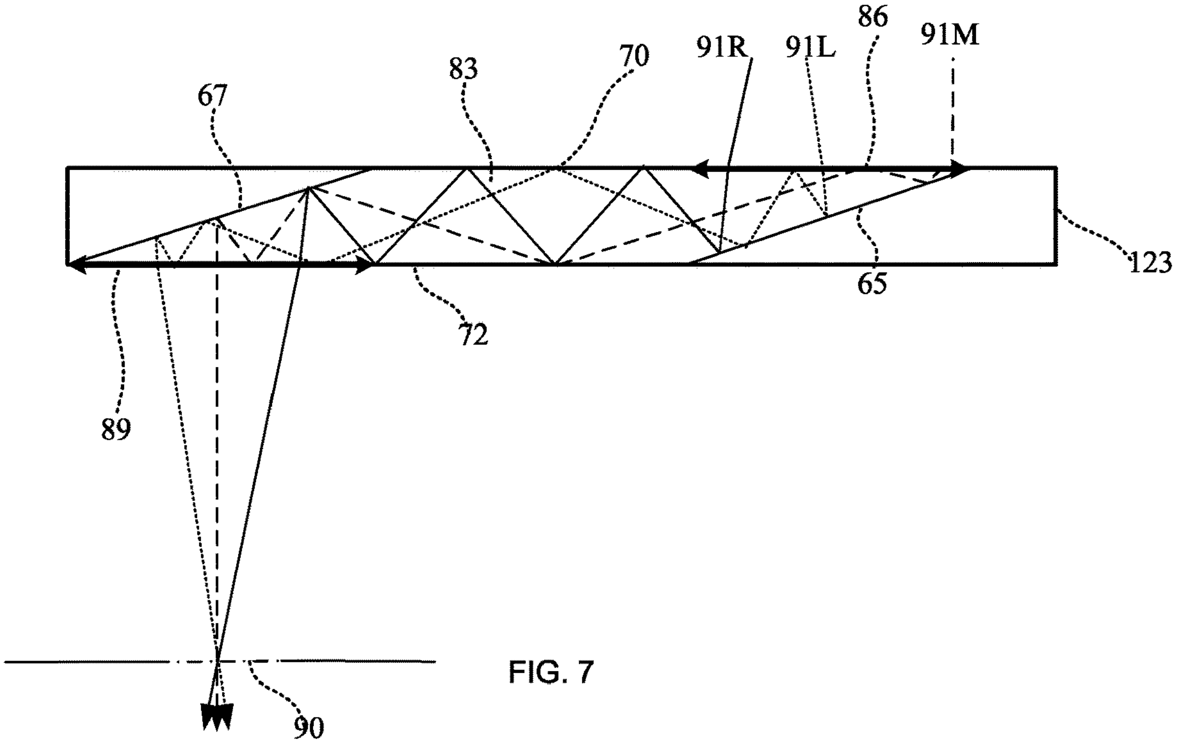
Figure 8A:
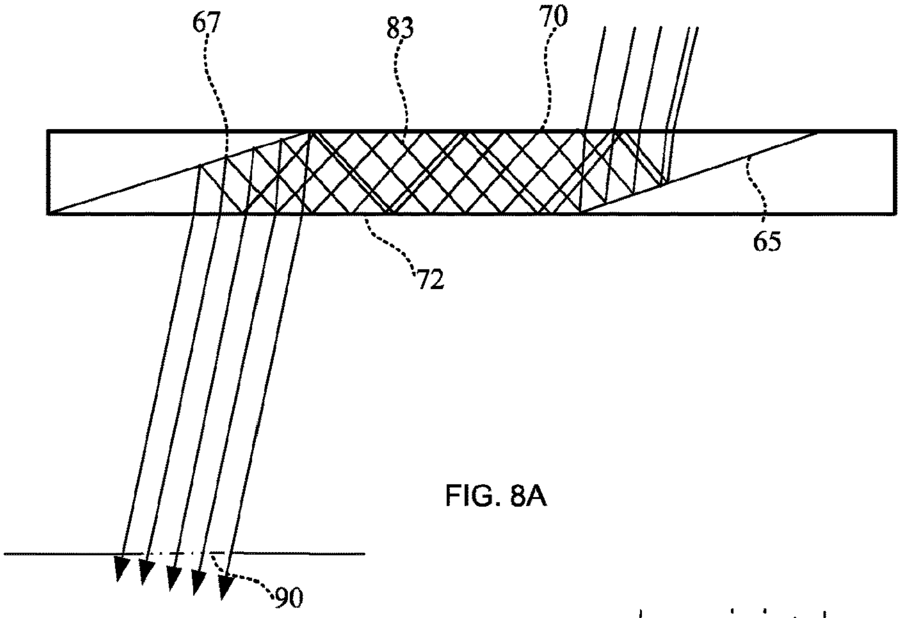
Figure 8B:
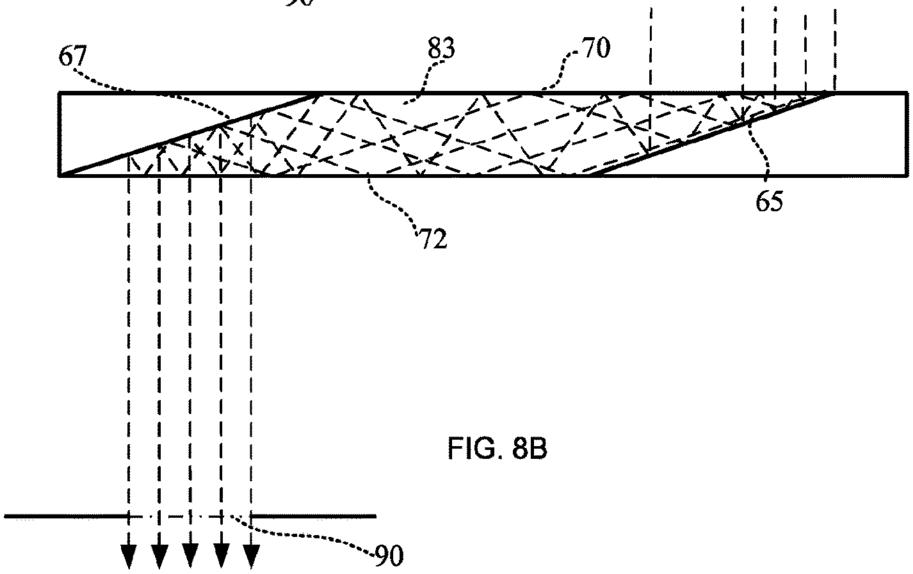
Figure 8C:
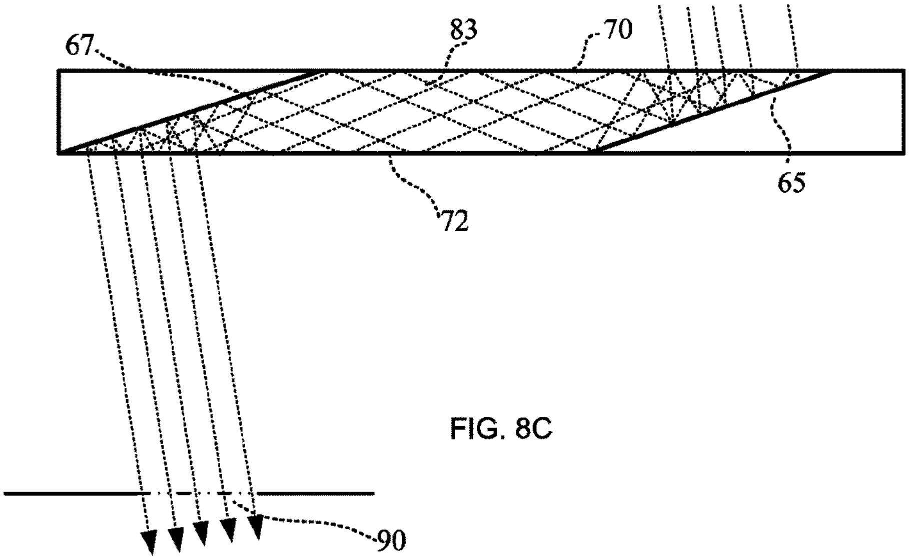
Figure 9:
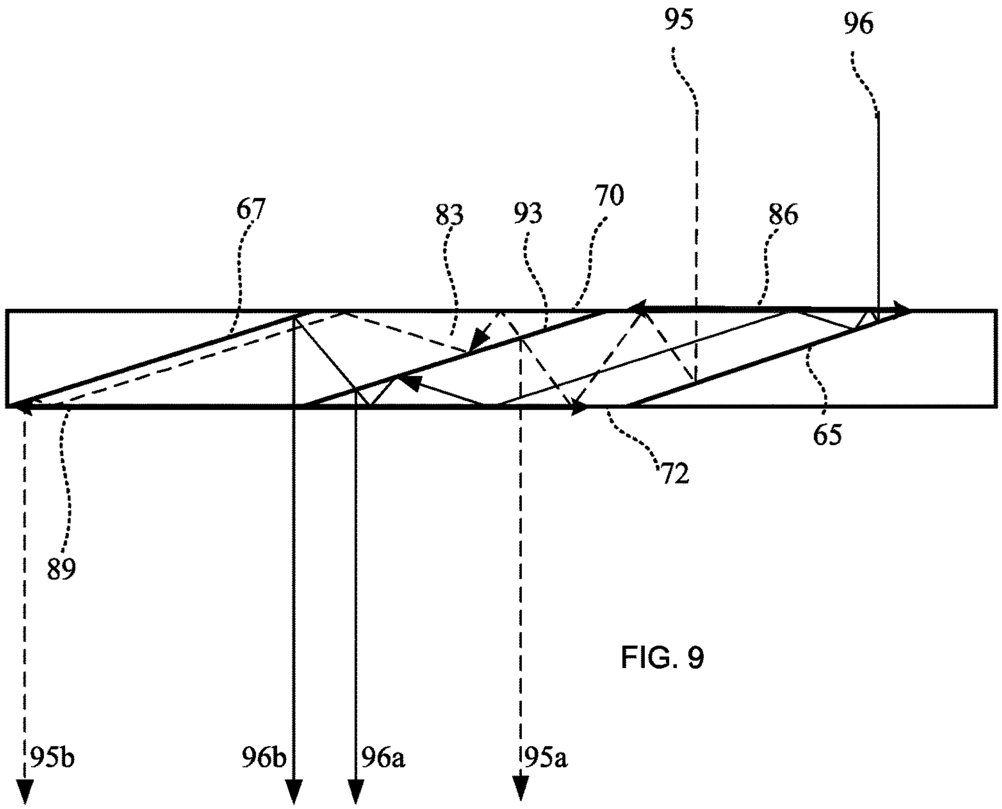
Figure 10:
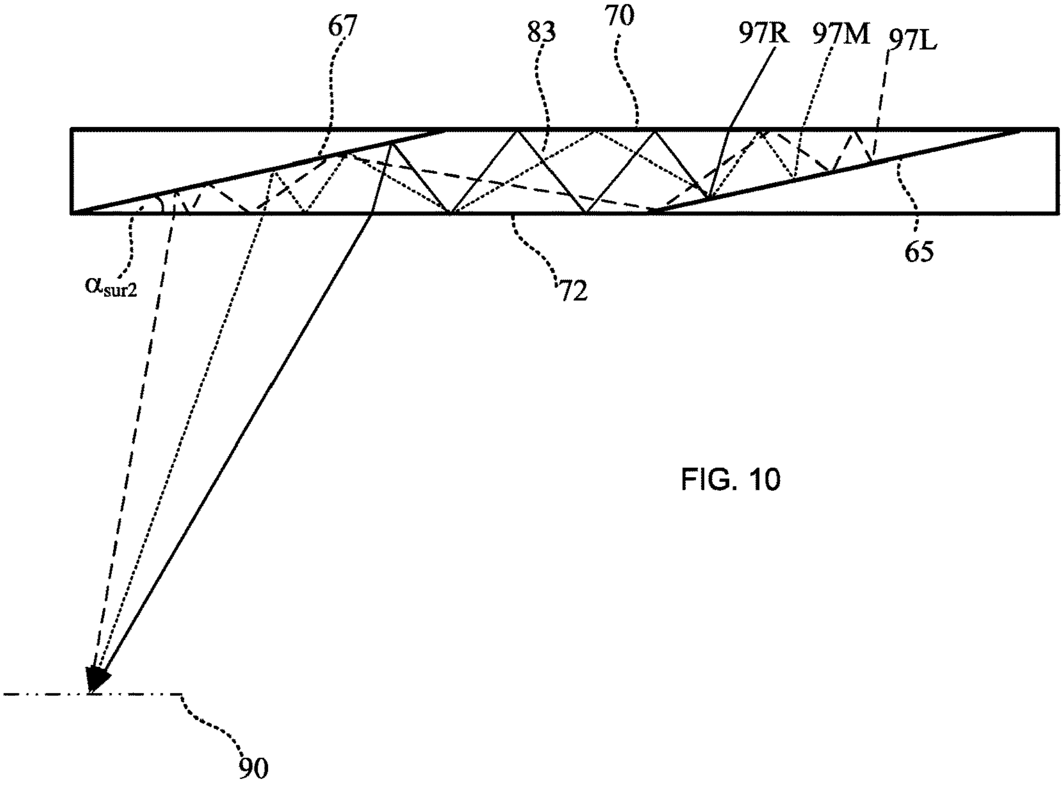
Figure 11:
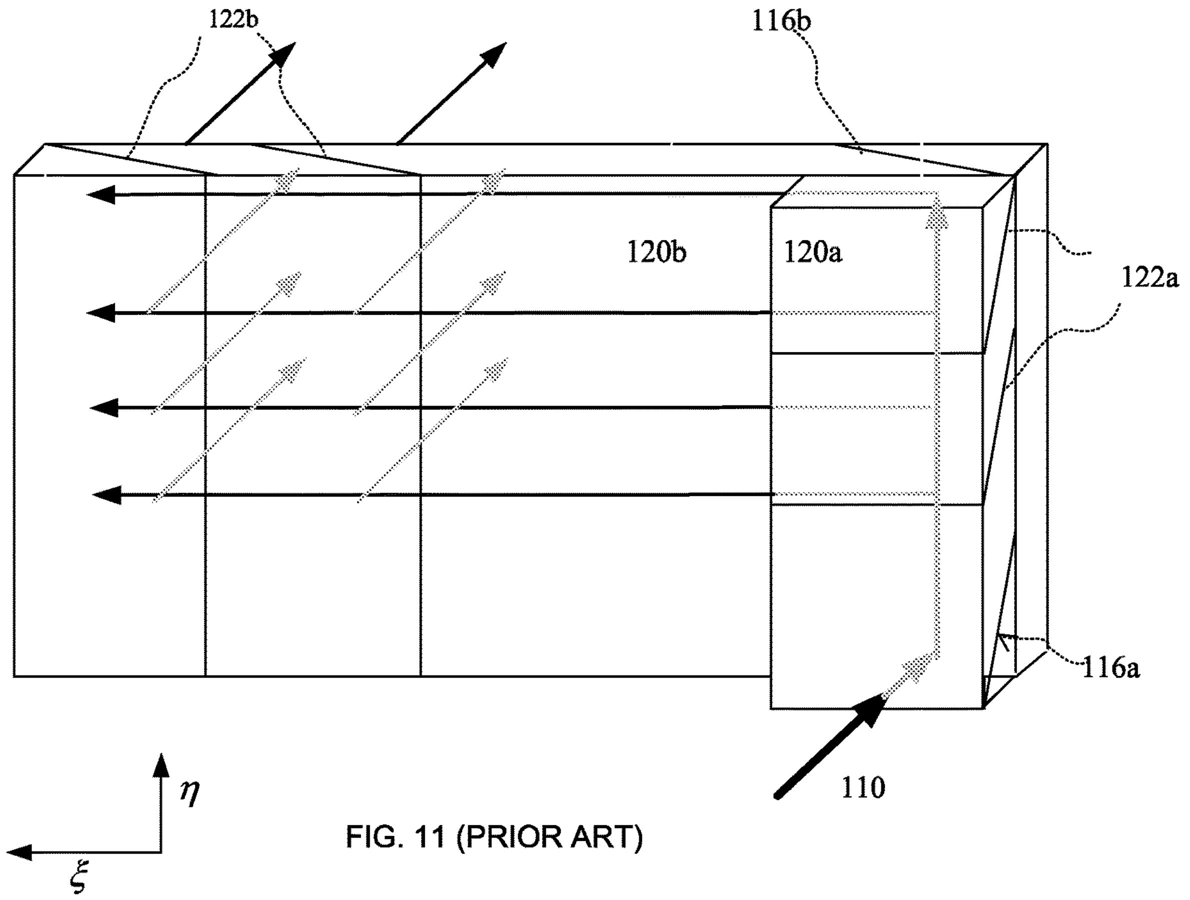
Figure 12:
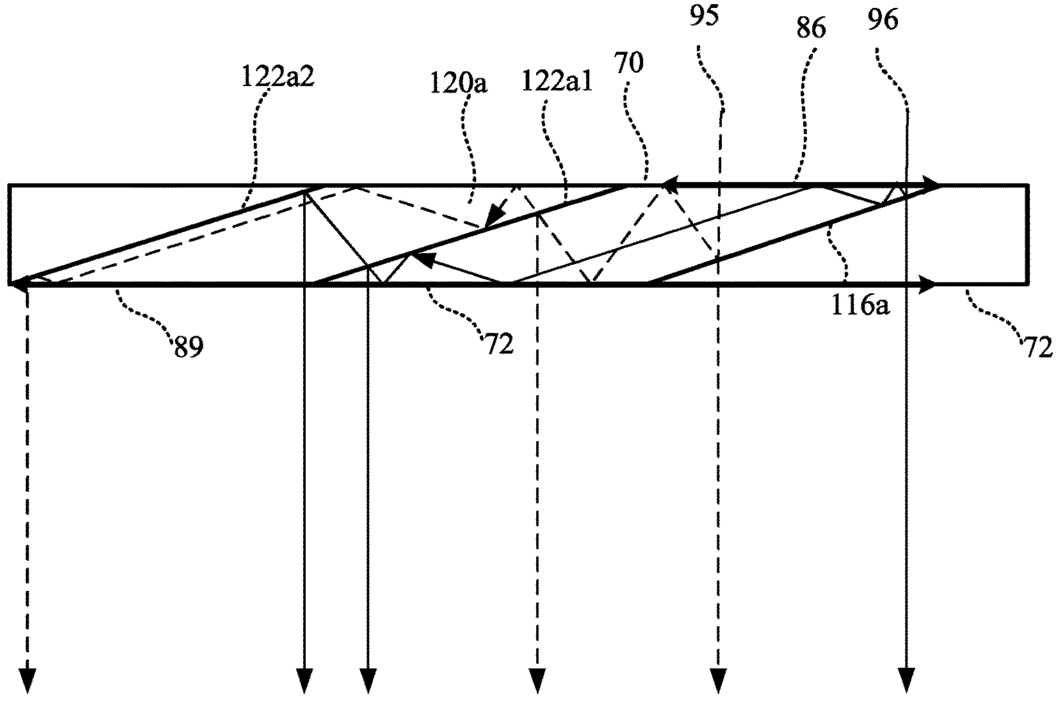
Figure 13:
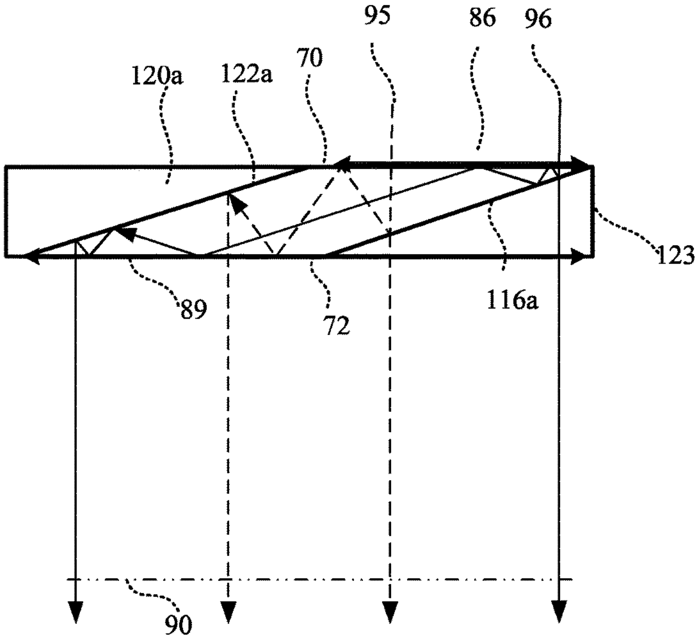
Figure 14:
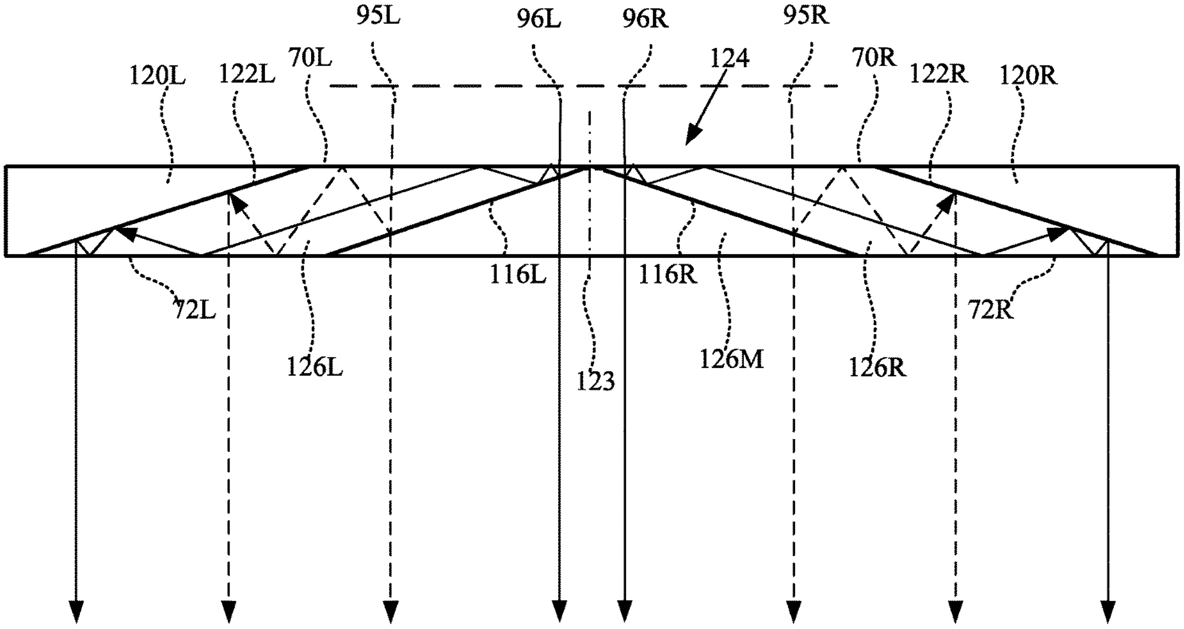
Figure 15:
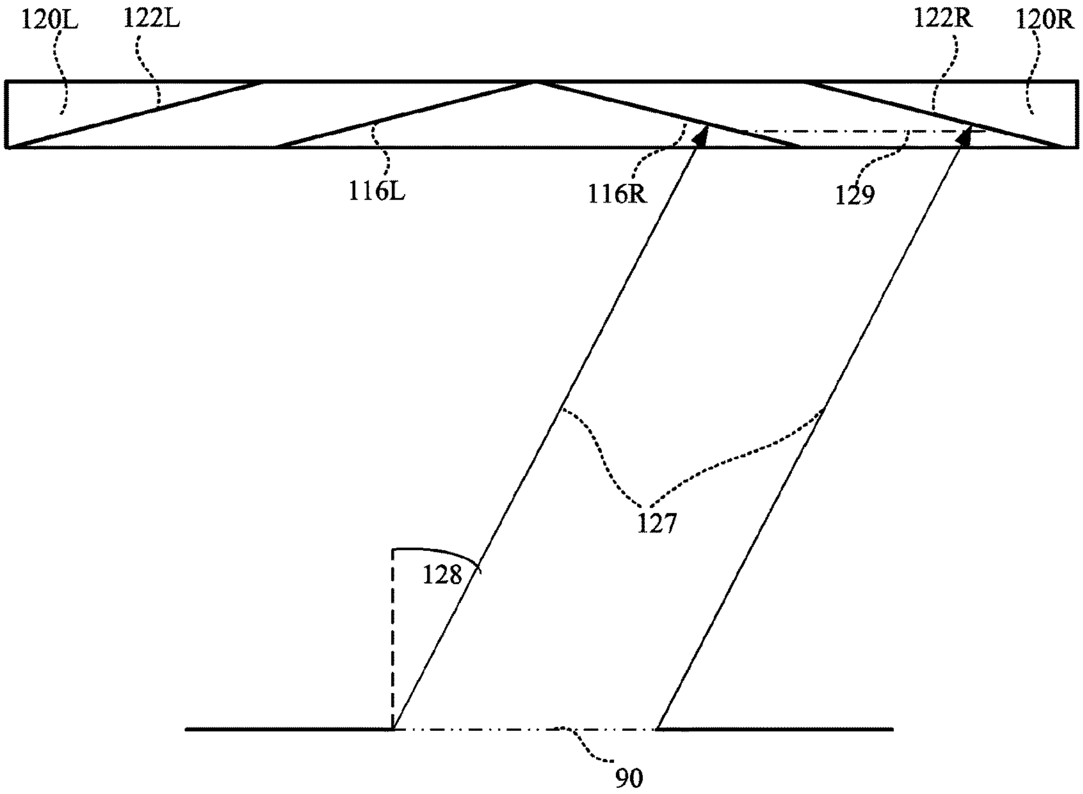
Figure 16:
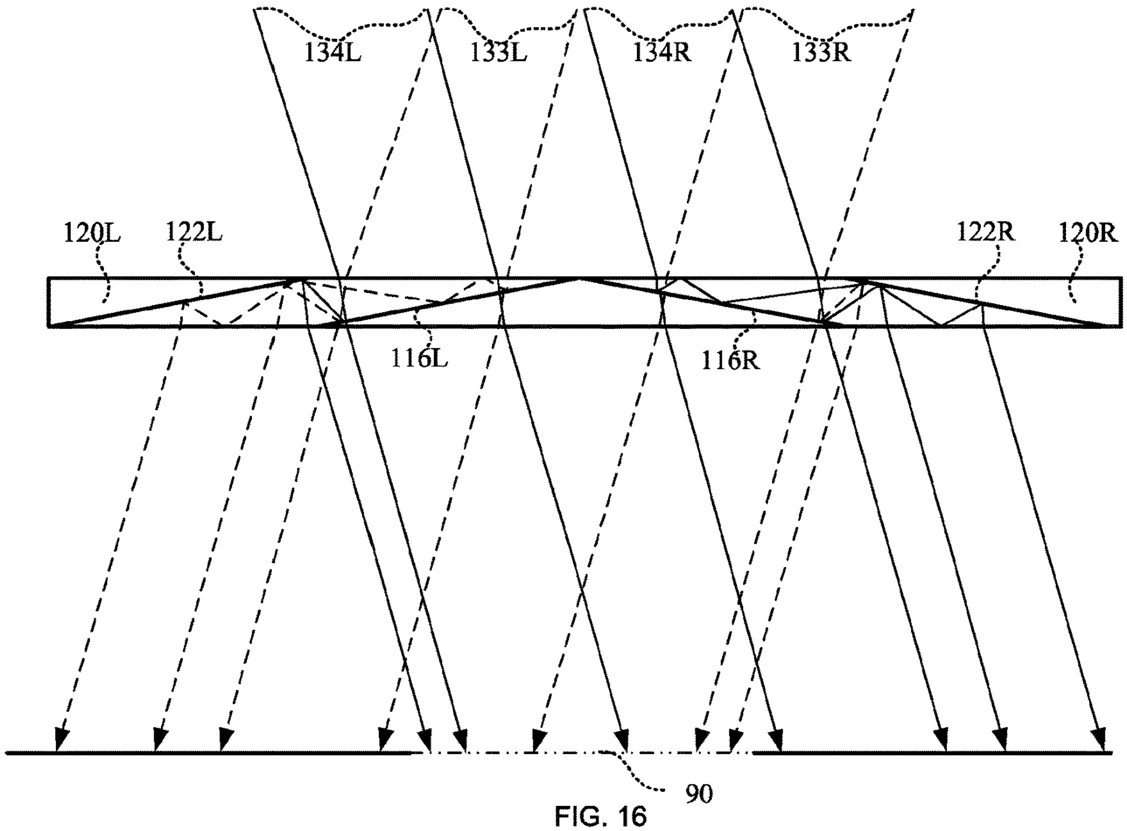
Figure 17:
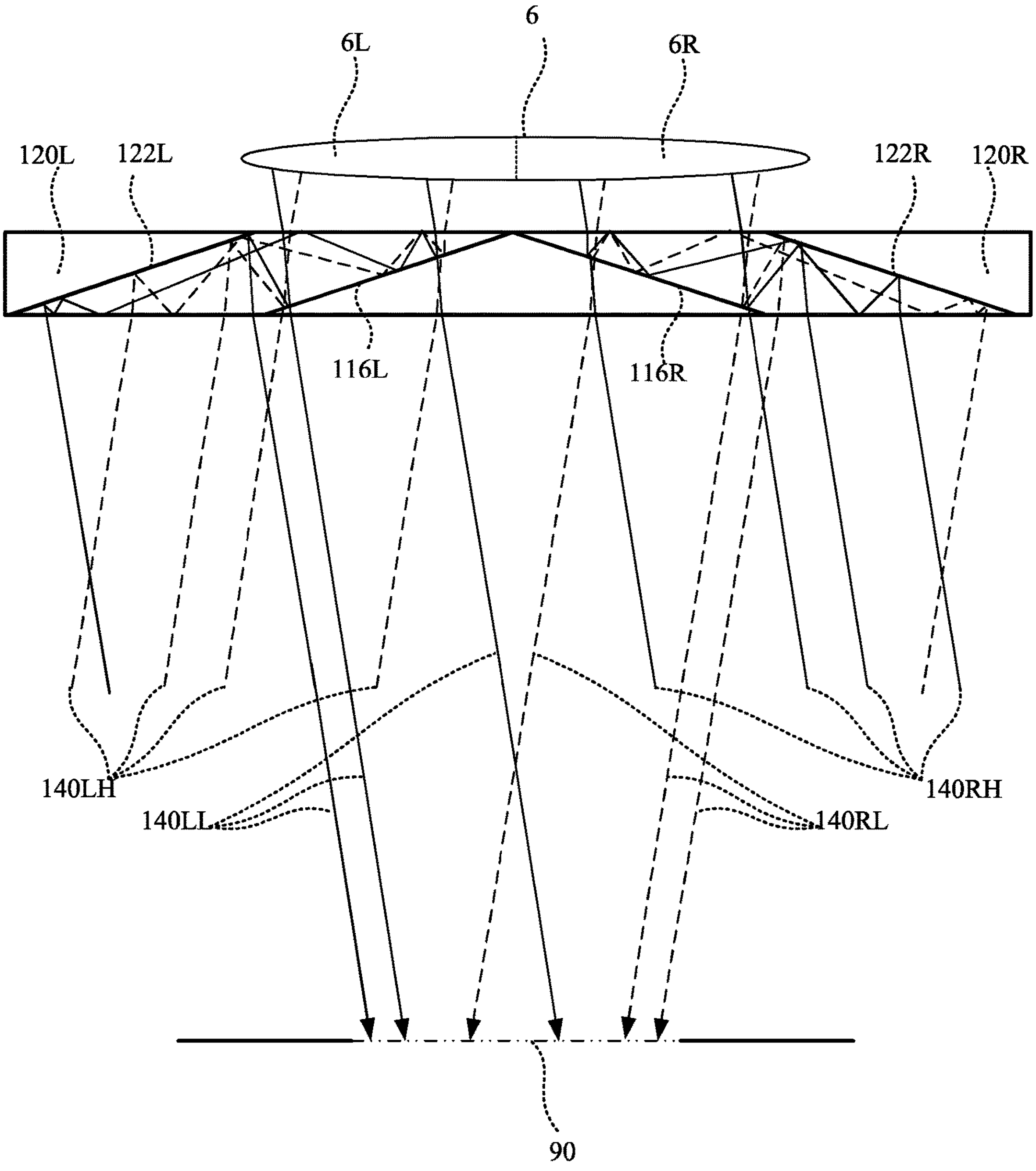
Figure 18:
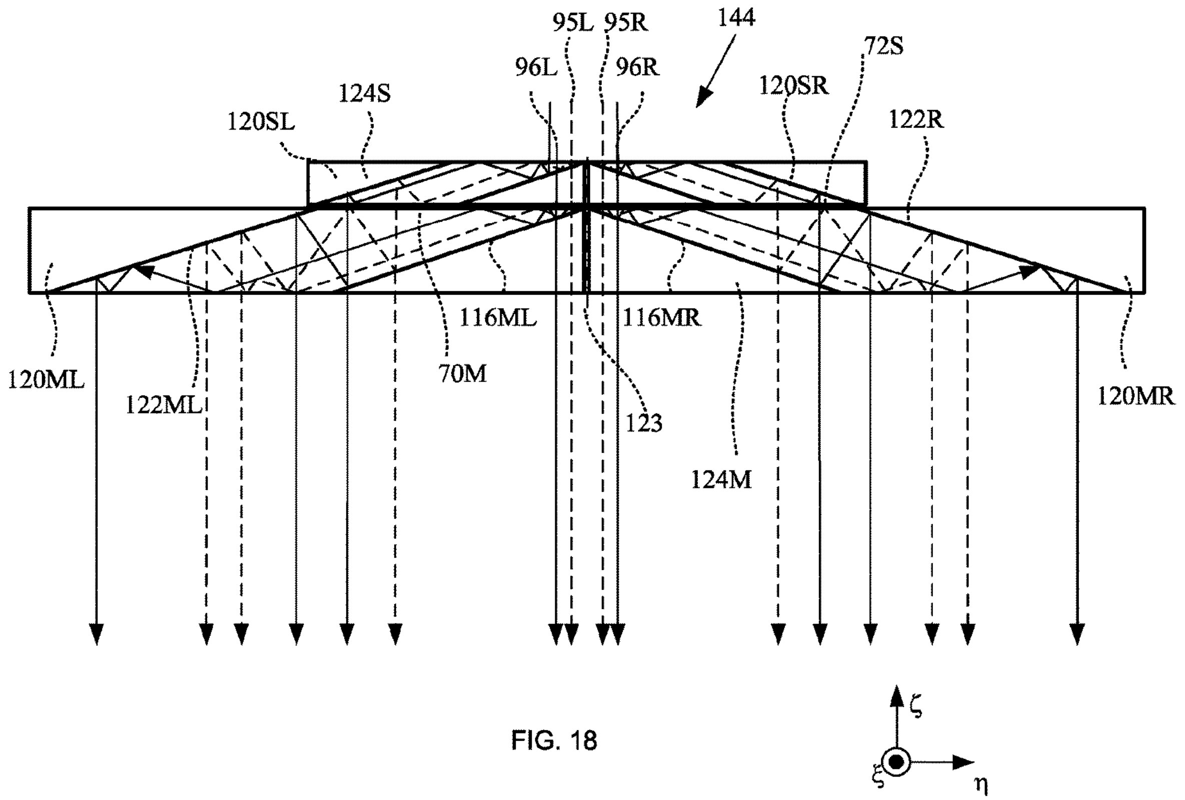
Figure 19:
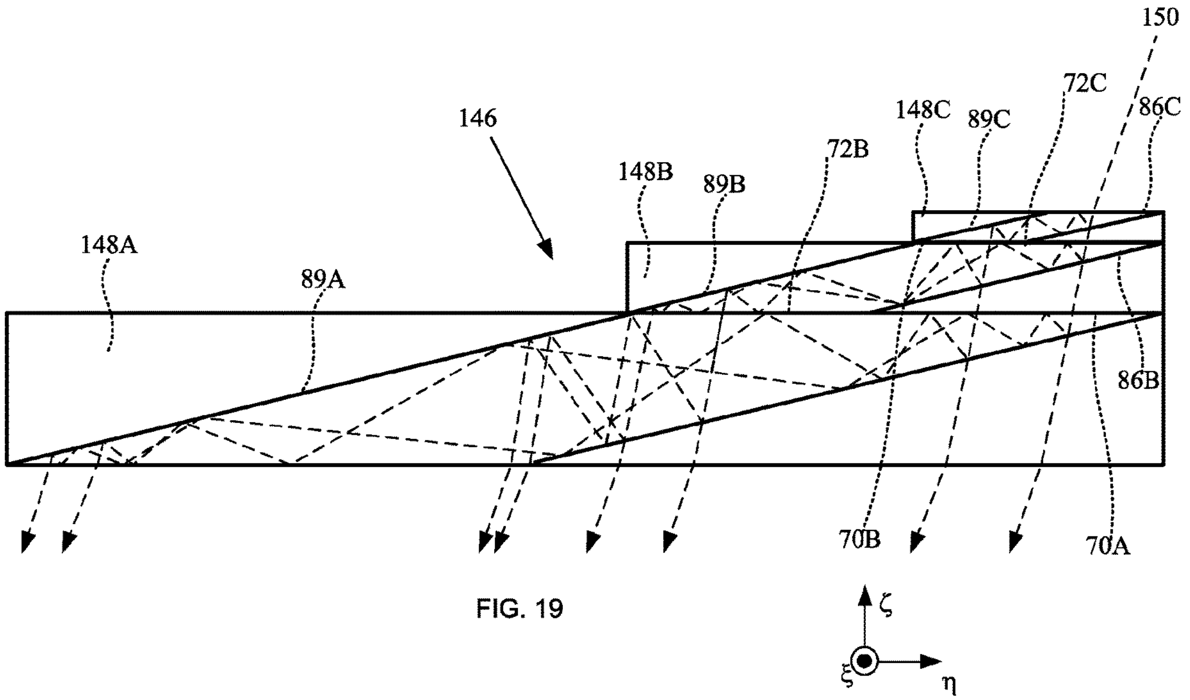
Figure 20:
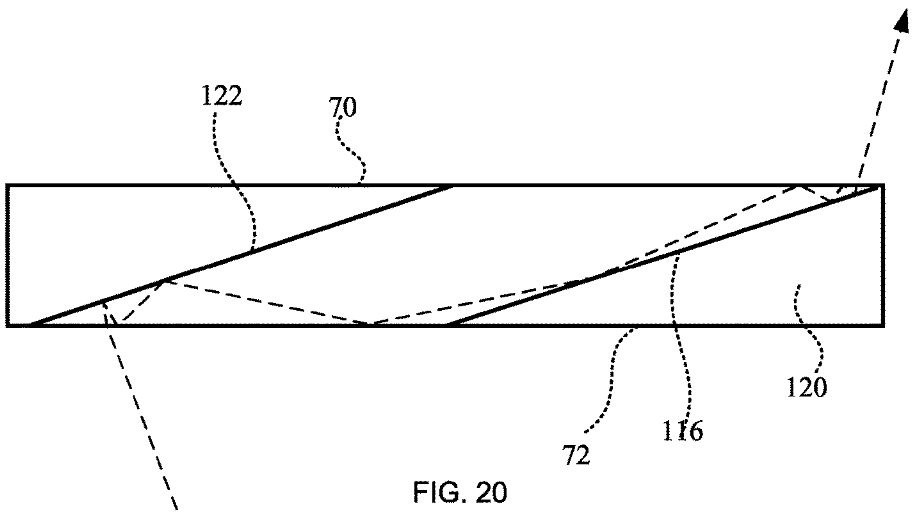
Figure 21A:
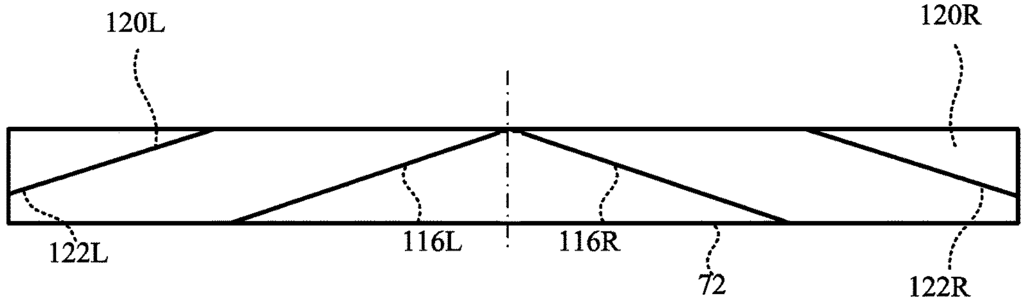
Figure 21B:
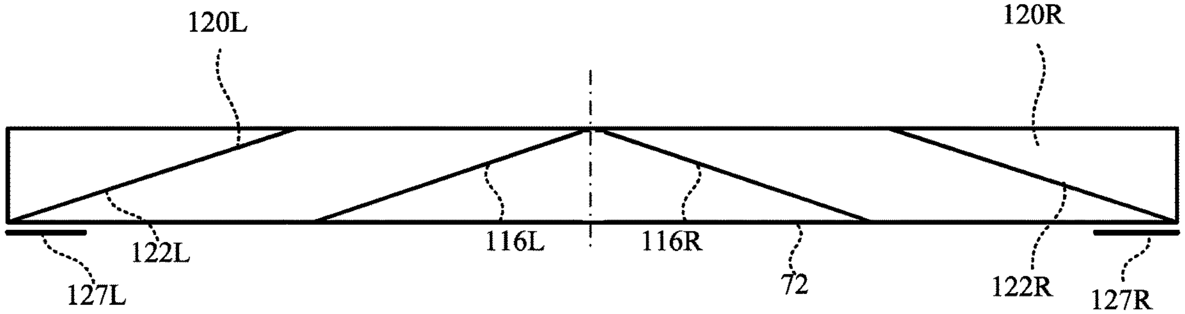
Figure 22A:
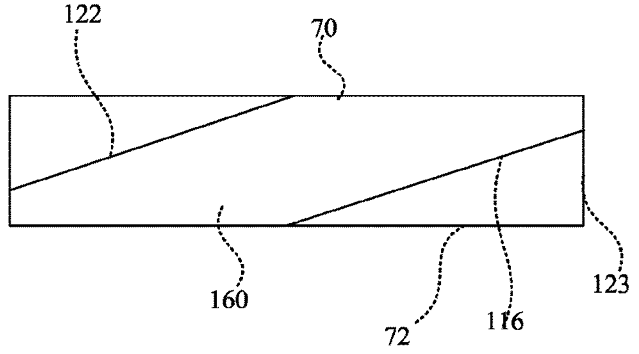
Figure 22B:
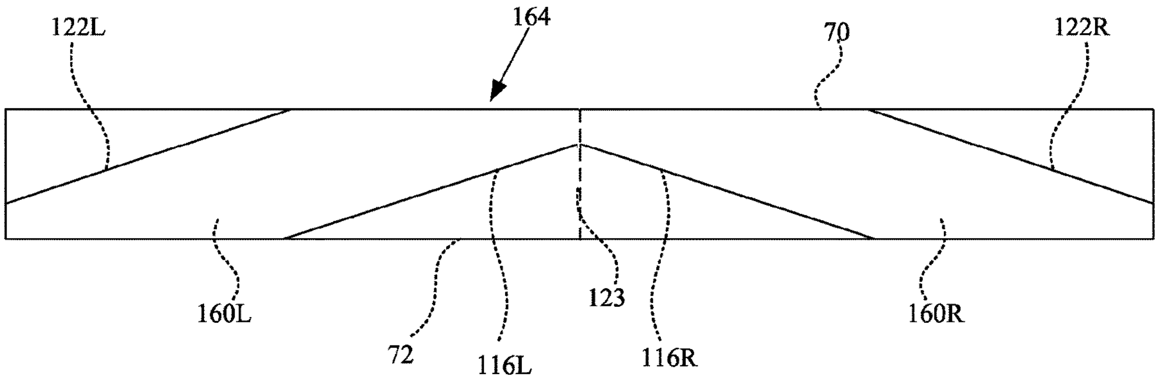
Figure 22C:
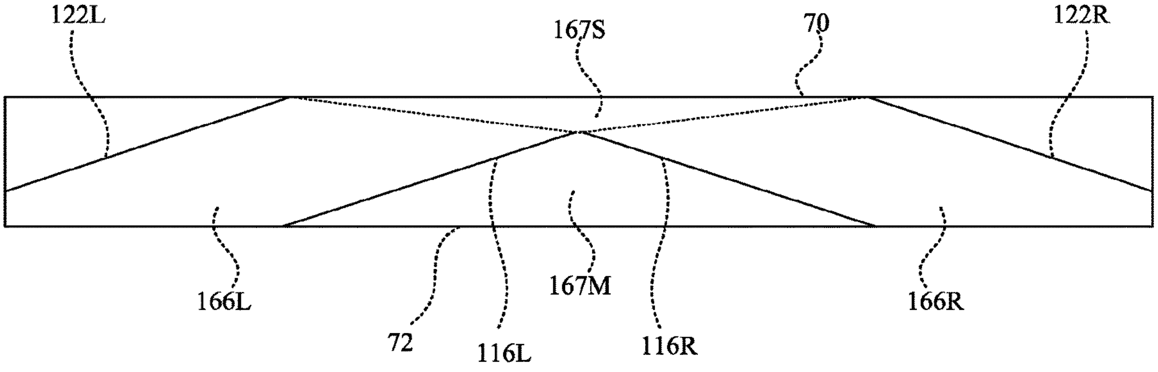

FIGS. 5A, 5B, and 5C illustrate sectional views of a prior-art transparent substrate having coupling-in and coupling-out surfaces, and a partially reflecting redirecting element;

FIGS. 6A and 6B schematically illustrate the creation of a gap and a ghost image in the coupled-out image;

FIG. 7 is a schematic sectional view of a substrate-guided embodiment having a single coupling-in element and a single coupling-out element, wherein all the rays are coupled towards the output pupil, according to the present invention;

FIGS. 8A, 8B and 8C are schematic sectional views of substrate-guided embodiments having a single coupling-in element and a single coupling-out element, wherein all the rays, for the entire coupled field-of-view, are coupled towards the output pupil, according to the present invention;

FIG. 9 is a schematic sectional view of a substrate-guided embodiment having a single coupling-in element and two coupling-out elements, according to the present invention;

FIG. 10 is a schematic sectional view of a substrate-guided embodiment having a single coupling-in element and a single coupling-out element, wherein the coupled-out image is inclined in relation to the normal to the substrate plane, according to the present invention;

FIG. 11 is a diagram illustrating a prior art method to expand an image having a finite FOV along two axes utilizing a double light-guide optical element configuration;

FIG. 12 is a schematic sectional view of a substrate-guided beam expander having a single partially reflecting coupling-in element and two coupling-out elements, according to the present invention;

FIG. 13 is a schematic sectional view of a substrate-guided beam expander having a single partially reflecting coupling-in element and a single coupling-out element, according to the present invention;

FIG. 14 is a schematic sectional view of a substrate-guided beam expander having two partially reflecting coupling-in elements and two coupling-out elements, arranged in a symmetrical configuration, according to the present invention;

FIG. 15 is a schematic sectional view of substrate-guided beam expander having two partially reflecting coupling-in elements and two coupling-out elements, arranged in a symmetrical configuration, wherein only part of the coupled light rays reach the output pupil, according to the present invention;

FIG. 16 is another schematic sectional view of a substrate-guided beam expander having two partially reflecting coupling-in elements, and two coupling-out elements, arranged in a symmetrical configuration, according to the present invention;

FIG. 17 is yet another schematic sectional view of a substrate-guided beam expander having two partially reflecting coupling-in elements and two coupling-out elements, arranged in a symmetrical configuration, according to the present invention;

FIG. 18 is a schematic sectional view of a substrate-guided beam expander, having four partially reflecting coupling-in elements and four coupling-out elements, arranged in a two-step symmetrical configuration, according to the present invention;

FIG. 19 is a schematic sectional view of a substrate-guided embodiment having three coupling-in elements and three coupling-out elements, arranged in a three-step asymmetrical configuration, wherein the coupled-out image is inclined in relation to the normal to the substrate plane, according to the present invention;

FIG. 20 schematically illustrate the creation of a gap and a ghost image in the coupled-out image of a beam expander;

FIGS. 21A and 21B represent schematic sectional views of a substrate-guided beam expander having two partially reflecting coupling-in elements and two coupling-out elements, arranged in a symmetrical configuration, wherein the edge parts of the coupling-out elements are inactivated, according to the present invention and FIGS. 22A, 22B and 22C represent schematic sectional views of a substrate-guided beam expander having two partially reflecting coupling-in elements and two coupling-out elements, arranged in a symmetrical configuration, wherein the edge parts of the coupling-out and the coupling-in elements are truncated, according to the present invention.

DETAILED DESCRIPTION OF EMBODIMENTS

Figure 1:
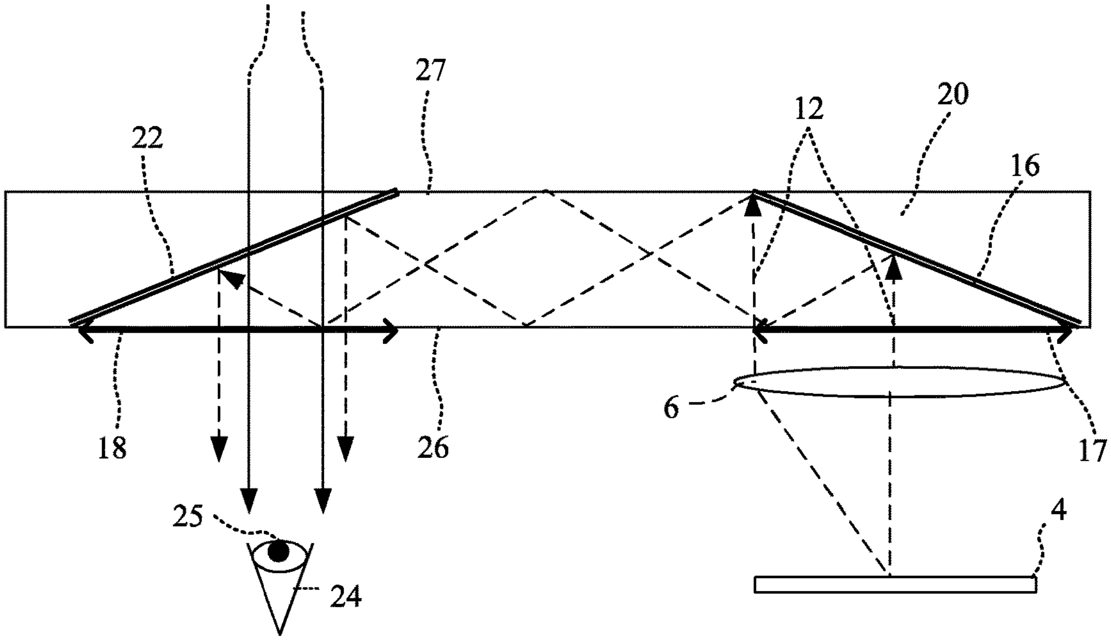

FIG. 1 illustrates a sectional view of a prior art light-transmitting substrate, wherein a first reflecting surface 16 is illuminated by a collimated light wave 12 emanating from a display source 4 and collimated by a lens 6 located between the source 4 and a substrate 20 of the device. The reflecting surface 16 reflects the incident light from the source 4 such that the light wave is trapped inside the planar substrate 20, by total internal reflection. After several reflections off the major surfaces 26, 27 of the substrate 20, the trapped light waves reach a partially reflective element 22, which couple the light out of the substrate into the eye 24 of a viewer, which is located inside an output pupil 25. Herein, the input aperture 17 of the substrate 20 is defined as the aperture through which the input light waves enter the substrate, and the output aperture 18 of the substrate is defined as the aperture through which the trapped light waves exit the substrate. In the case of the substrate illustrated in FIG. 1, both the input and the output apertures coincide with the lower surface 26. Other configurations are envisioned, however, in which the input and the image light waves from the displace source 4 are located on opposite sides of the substrate, or on one of the edges of the substrate. As illustrated, the active areas of the input and the output apertures, which are approximately the projections of the coupling-in 16 and the coupling-out 22 elements on the major surface 26, respectively, are similar to each other.

In HMD systems, it is required that the entire area of the EMB be illuminated by all the light waves emerging from the display source, to enable the viewer's eye looking at the entire FOV of the projected image simultaneously. As a result, the output aperture of the system should be extended accordingly. On the other hand, it is required that the optical module should be light and compact. Since the lateral extent of the collimating lens 6 is determined by the lateral dimension of the input aperture of the substrate, it is desired that the input aperture should be as small as possible. In systems such as those illustrated in FIG. 1, wherein the lateral dimensions of the input aperture are similar to those of the output aperture, there is an inherent contradiction between these two requirements. Most of the systems based on this optical architecture suffer from small EMB and small achievable FOV, as well as from a large and cumbersome imaging module.

Figure 2:
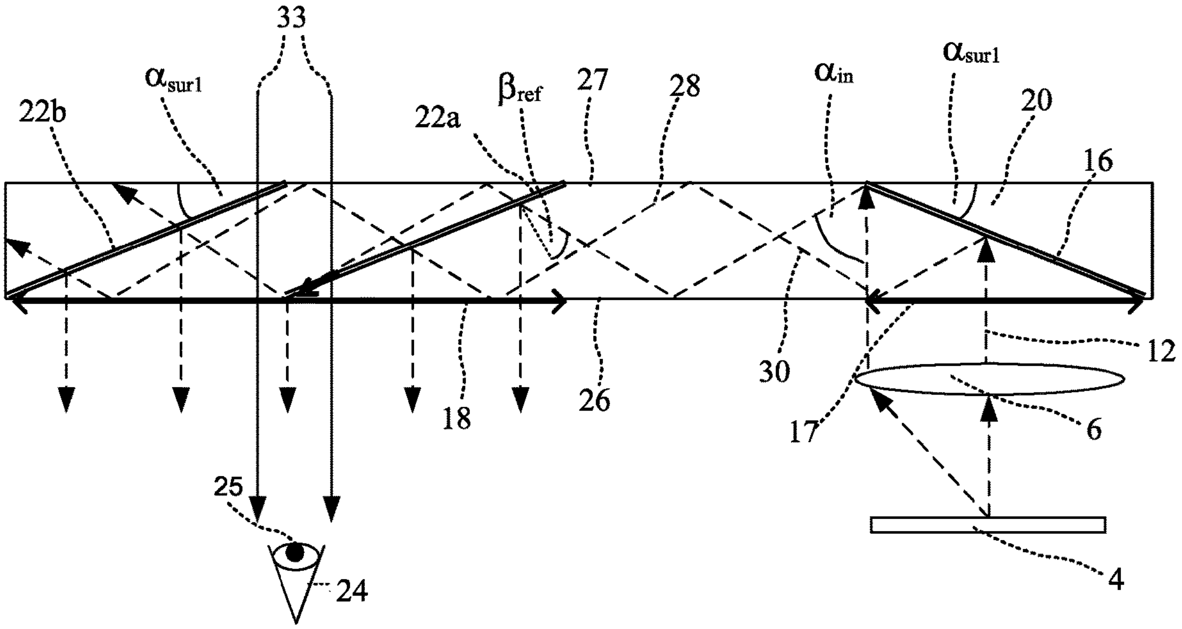

An embodiment which solves this problem, at least partially, is illustrated in FIG. 2, wherein the element which couples-out the light waves from the substrate is an array of partially reflecting surfaces 22*a*, 22*b* etc. The output aperture of this configuration can be extended by increasing the number of partially reflecting surfaces embedded inside the substrate 20. It is thus possible to design and construct an optical module having a small input aperture, as well as a large output aperture. As can be seen, the trapped rays arrive at the reflecting surfaces from two distinct directions 28, 30. In this particular embodiment, the trapped rays arrive at the partially reflecting surface 22*a* from one of these directions 28 after an even number of reflections from the substrate major surfaces 26 and 27, wherein the incident angle between the trapped ray and the normal to the reflecting surface is $\beta_{ref}$.

The trapped rays arrive at the partially reflecting surface 22*b* from the second direction 30 after an odd number of reflections from the substrate surfaces 26 and 27, wherein the incident angle between the trapped ray and the normal to the reflecting surface is $\beta_{ref}$.

As further illustrated in FIG. 2, for each reflecting surface, each ray first arrives at the surface from the direction 30, wherein some of the rays again impinge on the surface from direction 28. In order to prevent undesired reflections and ghost images, it is important that the reflectance be negligible for the rays that impinge on the surface having the second direction 28.

A solution for this requirement that exploits the angular sensitivity of thin film coatings, was previously proposed in the Publications referred to hereinabove. The desired discrimination between the two incident directions can be achieved if one angle is significantly smaller than the other one. It is possible to provide a coating with very low reflectance at high incident angles, and a high reflectance for low incident angles. This property can be exploited to prevent undesired reflections and ghost images by eliminating the reflectance in one of the two directions.

Figure 3A:
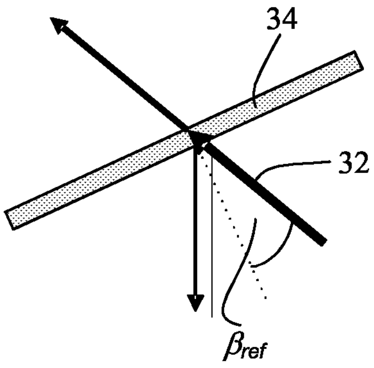
Figure 3B:
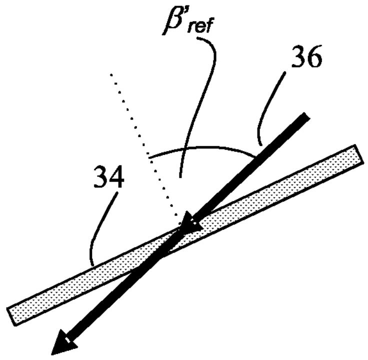

Referring now specifically to FIGS. 3A and 3B, these figures illustrate desired reflectance behavior of partially reflecting surfaces 34. While the ray 32 (FIG. 3A), having an off-axis angle of $\beta_{ref}$, is partially reflected and coupled out of the substrate 20, the ray 36 (FIG. 3B), which arrives at an off-axis angle of $\beta'_{ref}$ to the reflecting surfaces 34, is transmitted through the reflecting surfaces 34, without any notable reflection.

Figure 4:
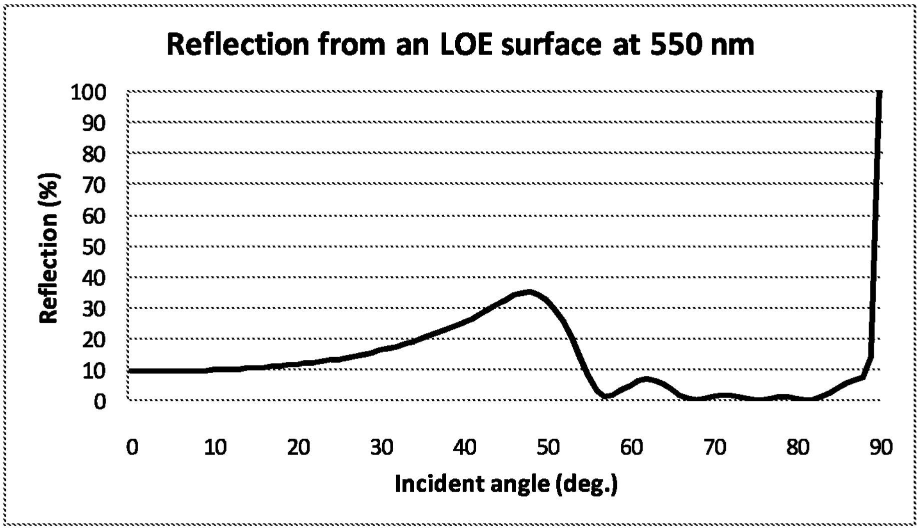

FIG. 4 illustrates the reflectance curve of a typical partially reflecting surface of this specific system, as a function of the incident angle for S-polarized light with the wavelength $\lambda$=550 nm. For a full-color display, similar reflectance curves should be achieved for all the other wavelengths in the relevant visible spectrum, usually for most display sources, between 430 nm and 660 nm. There are two significant regions in this graph: between 65° and 85°, where the reflectance is very low, and between 10° and 40°, where the reflectance increases monotonically with increasing incident angles. As can be seen in FIGS. 3 and 4, the requested reflectance behavior of the partially reflective surfaces 22 of the embodiment illustrated in FIG. 2, is not conventional. Furthermore, to keep the low reflectance at the higher angular region, the reflectance at the lower angular region cannot be higher than 20%-30%. Furthermore, to achieve a uniform brightness over the entire FOV, it is required that the reflectance of partially reflecting surfaces will be increased gradually towards the edge of the substrate. Hence, the maximum achievable efficiency is comparatively low and usually cannot be more than 10%.

FIGS. 5A and 5B illustrate embodiments for overcoming the above-described problem. Instead of using a single element (22 in FIG. 2), which performs the dual function of coupling the light waves out of the substrate 20, as well as directing the light waves into the user's eye 24, the requested function is divided into two different elements. Namely, one element embedded inside the substrate, couples the light waves out of the substrate, while a second conventional partially reflecting element, which is located out of the substrate, redirects the light waves into the viewer's eye. As illustrated in FIG. 5A, two rays 63 (dashed lines) from a plane light wave emanating from a display source and collimated by a lens (not shown) enter a light transparent substrate 64, having two parallel major surfaces 70 and 72, through the input aperture 86, at an incident angle of $\alpha_{in}^{(0)}$ with respect to the major surfaces 70, 72 of the substrate. The rays impinging on the reflecting surface 65 are inclined at an angle $\alpha_{sur1}$ to the major surfaces of the substrate. The reflecting surface 65 reflects the incident light rays such that the light rays are trapped inside a planar substrate 64 by total internal reflection from the major surfaces. To differentiate between the various "propagation orders" of the trapped light waves, a superscript (i) will denote the order i. The input light waves which impinge on the substrate in the zero-order are denoted by the superscript (0). After each reflection from the coupling-in reflecting surface, the order of the trapped ray is increased by one from (i) to (i+1). The off-axis angle $\alpha_{in}^{(1)}$ between the trapped ray of the first order and the normal to the major surfaces 70, 72 is $$\alpha_{in}^{(1)}=\alpha_{in}^{(0)}+2\cdot\alpha_{sur1}. \quad (1)$$

After several reflections off the surfaces of the substrate, the trapped light rays reach a second flat reflecting surface 67, which couples the light rays out of the substrate. Assuming that surface 67 is inclined at the same angle to the major surfaces as the first surface 65, that is to say, surfaces 65 and 67 are parallel and $\alpha_{sur2}=\alpha_{sur1}$, then the angle $\alpha_{out}$ between the coupled-out rays and the normal to the substrate plane is $$\alpha_{out}=\alpha_{in}^{(1)}-2\cdot\alpha_{sur2}=\alpha_{in}^{(1)}-2\cdot\alpha_{sur1}=\alpha_{in}^{(0)}. \quad (2)$$

Hence, the coupled-out light rays are inclined to the substrate at the same angle as the incident light rays. So far, the coupled-in light waves behave in a similar manner to the light waves illustrated in FIG. 1. FIG. 5A, however, illustrates a different behavior wherein two light rays 68 (dashed-dotted lines), having the same incident angle of $\alpha_{in}^{(0)}$ as rays 63, impinge on the right side of the reflecting surface 65. After two reflections from surface 65, the light waves are coupled inside the substrate 64 by a total internal reflection, and the off-axis angle of the trapped rays inside the substrate is now $$\alpha_{in}^{(2)}=\alpha_{in}^{(1)}+2\cdot\alpha_{sur1}=4+\alpha_{sur1}. \quad (3)$$

After several reflections off the major surfaces of the substrate, the trapped light rays reach the second reflecting surface 67. The light rays 68 are reflected twice from the coupling-out surface 67 and are coupled out from the substrate at the same off-axis angle $\alpha_{out}$ as are the other two rays 63, which are reflected only once from surfaces 65 and 67, which is also the same incident input angle of these four rays on the substrate major planes. Although all the four rays impinge on, and are coupled out of, the substrate at the same off-axis angle, there is a substantial difference between them: the two light rays 68, which incident on the right side of the reflecting surface 65 are closer to the right edge 66 of substrate 64, are reflected twice from surfaces 65 and 67, and are coupled-out from the substrate at the left side of surface 67, which is closer to the opposite left edge 69 of the substrate. On the other hand, the two light rays 63 which incident on the left side of the reflecting surface 65, are closer to the center of substrate 64, and are reflected once from surfaces 65 and 67. They are coupled out from the substrate at the right side of surface 67, which is closer to the center of the substrate.

As further illustrated in FIGS. 5A and 5B, the inclination angle $\alpha_{out}$ of the image can be adjusted by adding a partially reflecting surface 79 which is inclined at an angle of $\alpha_{red}$ to the surface 72 of the substrate. As shown, the image that is coupled out through the output aperture 89 of the substrate, is reflected and rotated such that it passes again through the substrate substantially normal to the substrate's major surfaces and reaches the viewer's eye 24. To minimize distortion and chromatic aberrations, it is preferred to embed surface 79 in a redirecting prism 80, and to complete the shape of the substrate 64 with a second prism 82, both being fabricated of the same material, which should not necessarily be similar to that of prism 80. To minimize the thickness of the system, it is possible, as illustrated in FIG. 5B, to replace the single reflecting surface 79 with an array of parallel partially reflecting surfaces 79*a*, 79*b*, etc., where the number of the partially reflecting surfaces can be determined according to the requirements of the system. Another way to redirect the coupled-out light waves into the viewer's eye is to use a flat meta-surface structured with subwavelength-scaled patterns.

As was previously shown in Eq. (20) of the Publication WO2017/141239 referred to hereinabove, the condition $$\alpha_{in}^{(2)}(\max)<90°-\alpha_{sur2}, \quad (4)$$

must be fulfilled. That is to say, the incident angle of the coupled ray $\alpha_{in}^{(2)}$ (max) with respect to the normal to the major surfaces 70, 72, should be smaller than the inclination angle of the coupling-out surface 67 with respect to this normal. FIGS. 6A and 6B illustrate an embodiment wherein the condition of Eq. (4) is violated, that is, the relation $$\alpha_{in}^{(2)}>90°-\alpha_{sur2}, \quad (5)$$

for at least one of the coupled light waves is fulfilled instead. As illustrated in FIG. 6A, the first incidence of the coupled ray 81 at surface 67 is from the lower major surface 72. As a result, the coupled ray is reflected twice from surface 67, and after the second reflection is coupled out from the substrate at the output angle $$\alpha_{out}=\alpha_{in}^{(2)}-4\cdot\alpha_{sur2}=\alpha_{in}^{(2)}-4\cdot\alpha_{sur1}=\alpha_{in}^{(0)}, \quad (6)$$

which is the "proper" output angle.

FIG. 6B illustrates a different ray 84 from the same coupled light wave that firstly impinges on surface 67 from the upper major surface 70 at a point 85. As a result, the coupled ray 84 is reflected from surface 67 at an off-axis angle $$\alpha_{in}^{(2)}(\text{act})=\alpha_{in}^{(2)}-2\cdot(\alpha_{in}^{(2)}-(90°-\alpha_{sur2}))=180°-2\cdot\alpha_{sur2}-\alpha_{in}^{(2)}. \quad (7)$$

Ray 84 now impinges on surface 67 from the lower major surface 72, is reflected twice from this surface, and after the second reflection is coupled out from the substrate at the output angle $$\alpha_{out}(\text{act})=\alpha_{in}^{(2)}(\text{act})-4\cdot\alpha_{sur2}=180°-10\cdot\alpha_{sur2}-\alpha_{in}^{(0)}, \quad (8)$$

This angle is not necessarily the required angle $\alpha_{in}^{(0)}$. Assuming, for example, that $\alpha_{sur2}=18°$, and $\alpha_{in}^{(0)}=10°$, then the actual ray coupled-out from substrate 64 has the direction of $\alpha_{out}(\text{act})=-10°$. In other words, not only is the "right" ray that should be coupled out as ray 84 missing from the image, and as a consequence a gap will be formed in the image, but instead, there is another ray that originated from a "wrong" direction, which forms a ghost image.

As shown in Eqs. (23) and (24) of Publication WO2017/141239, the consequence of Eq. (5) of the present specification is that the maximal inclination angle of surface 67 is given by $\alpha_{sur2}<16°$, and as a result, the minimal output angle of the central output light wave is $\alpha_{out}^{(0)}(\text{cen})>9°$. Namely, the coupled-out image is substantially inclined in relation to the normal to the substrate plane. Usually, however, it is required that the coupled-out image projected to the viewer's eye, will be oriented substantially normal to the substrate plane. Consequently, the inclination of the image, which is not coupled out from the substrate towards the output pupil of the system, should be adjusted by adding a partially reflecting surface 79, which is inclined at an angle of $$\frac{\alpha_{in}^{(0)}(cen)}{2}$$

to the surface 72 of the substrate, as shown in FIGS. 5A-5C.

An alternative method, for overcoming the above-described problem, according to the present invention, is illustrated thereafter. That is to say, at least part of the light waves trapped inside the substrate is reflected at least twice by the coupling-out element before being coupled out from the substrate through the output aperture, in a similar way to the embodiments of FIGS. 5A-5C. The light waves, however, are reflected in the direction of the output pupil from the coupling-out surface. Inevitably, the condition given in Eq. (5) will be violated, but as illustrated below, there are embodiments wherein the ghost images and the gaps in the image can be avoided.

The first example illustrated in FIG. 7 is appropriate mainly for optical systems with small to moderate FOV and EMB. As illustrated, the optical device, comprising a light-transmitting substrate 83 having at least two parallel major surfaces, a reflecting surface 65 for coupling light waves passing through the input aperture 86 into the substrate, and a reflecting surface 67, which is parallel to surface 65, for coupling the light waves out of the substrate through the output aperture 89 towards the output pupil 90 of the system. For see-through systems, wherein light rays from the external scene need to pass through the substrate to reach the viewer's eye, surface 67 should be partially reflective. Three rays from the two marginal and the central light waves of the image are coupled out from the substrate into the center of the output pupil 90. As shown, the light rays 91R, 91M, and 91L, having incident angles which are the maximal, central, and minimal angles in the FOV, are coupled out from the right, the center, and the left parts of the coupling-out surface 67, respectively. While rays 91M and 91L are coupled out after two reflections, ray 91R is coupled out after a single reflection from surface 67.

A possible approach to minimize the gap and the ghost image effects, illustrated in FIG. 6B, is to separate the conditions for creating these undesired effects. As explained hereinabove, the ray must fulfill two different requirements to deviate from its designated direction: it should be reflected at least twice from the coupling-out surface, and it should satisfy the relation of Eq. (5). As illustrated here, ray 91R does not fulfill the first condition. It is reflected only once from surface 67. Therefore, it can be allowed to satisfy Eq. (5). On the other hand, rays 91M and 91L are reflected twice from surface 67, and therefore they should not be allowed to satisfy Eq. (5). A possible way to achieve these requirements is by choosing the limiting condition for the central ray 91M, that is $$\alpha_{in}^{(2)}(\text{mid})=90°-\alpha_{sur2}. \quad (9)$$

Consequently $$\alpha_{in}^{(0)}(\text{mid})+4\cdot\alpha_{sur2}=90°-\alpha_{sur2}. \quad (10)$$

Assuming that the central light wave is coupled out normal to the substrate's major plane yields $$\alpha_{sur2}=18°. \quad (11)$$

FIGS. 8A, 8B and 8C illustrate a system wherein Eq. (11) is satisfied, the zero-order incident angles $\alpha_{in}^{(0)}$(max), $\alpha_{in}^{(0)}$(mid) and $\alpha_{in}^{(0)}$(min), are +10°, 0°, and −10° in the air, and the refractive index of the substrate is 2.0. The substrate's thickness is 4 mm, the eye-relief is 18 mm, and the output pupil diameter is 6 mm. As shown in FIGS. 8A, 8B and 8C, all the light rays having the maximal incident angle are reflected only once from surface 65 and consequently also once from surface 67, and hence, a ray having a "wrong" direction cannot be formed. All the rays having the minimal incident angle (FIG. 8C) are reflected twice from surface 65, and consequently, also twice from surface 67. Since they all fulfill the condition of Eq. (4), however, all the rays are coupled out at the proper direction. Regarding the rays having the central incident angle (FIG. 8B), a part of them is reflected only once from surfaces 65 and 67, but the rays that are reflected twice propagate inside the substrate parallel to surface 67, and hence, they cannot impinge on it directly from the upper surface 70. As a result, all the plotted rays illustrated in FIGS. 8A, 8B and 8C are coupled out from the substrate at the proper direction.

Apparently, the embodiment illustrated in FIGS. 8A, 8B and 8C is similar to the embodiment of FIG. 1. It has, however, one prominent advantage over the prior art. The inclination angle of surface 22 is in the order of 30°, and hence, the size of the output aperture is around 1.5·d, where d is the substrate's thickness. On the other hand, the inclination angle of surface 67 is 18°, and hence, the size of the output aperture in the present embodiment is around 3·d. Consequently, the output aperture can be doubled for a given substrate's thickness, or alternatively, the thickness of the substrate of the present embodiment can be reduced by a factor of two for a given output aperture.

There are applications, however, where it is required to further increase the output aperture while still maintaining the substrate as thin as possible. FIG. 9 illustrates an embodiment wherein the output aperture is expanded without increasing the thickness of the substrate. As shown, a partially reflecting surface 93 is embedded inside the substrate 83. Surface 93 is parallel to the coupling-in surface 65 and the coupling-out surface 67. That is, the inclination angle of surface 93 in relation to the major surfaces of the substrate 83 is $\alpha_{sur2}$. For the entire FOV of the image propagating inside the substrate 83, surface 93 is partially reflective. That is, it partially reflects and partially transmits the coupled-in light waves having an incident angle of $$\alpha_{pr}^{(0)}=\alpha_{in}^{(0)}+\alpha_{sur2}=\alpha_{in}^{(1)}-\alpha_{sur2} \quad (12)$$

and is totally reflective for light waves having an incident angle of $$\alpha_{pr}^{(1)}=\alpha_{in}^{(1)}+\alpha_{sur2}=\alpha_{in}^{(2)}\alpha_{sur2}. \quad (13)$$

A possible method to achieve relations (12) and (13) is to apply an optical adhesive, having a refractive index that is much lower than that of the substrate 83, on the partially reflecting surface 93. The critical angle $\alpha_{cr}$, which is set by the refractive indices of the substrate 83 and the surface 93, must satisfy the following relation $$\alpha_{pr}^{(0)}<\alpha_{cr}<\alpha_{pr}^{(1)} \quad (14)$$

for the entire FOV of the light waves, which are trapped inside the substrate 83.

For an optical system having the same parameters as that of the embodiment of FIGS. 8A, 8B and 8C, $\alpha_{pr}^{(1)}$(min)=49°, and $\alpha_{pr}^{(0)}$(max)=23°. Utilizing the Norland NA-148 optical adhesive, having a refractive index of 1.48, yields the critical angle of $\alpha_{cr}$=47.7°, and hence, the condition of Eq. 14 is satisfied.

As illustrated in FIG. 9, a ray 95 (dashed line) is coupled into the substrate 83 after one reflection from surface 67, and hence, propagated inside the substrate 83, having the first order off-axis angle of $\alpha_{in}^{(1)}$. After a few reflections from the major surfaces of the substrate 83, ray 95 impinges on surface 93. Since the ray impinges on the surface from the right side, it behaves in a similar manner to the rays that impinge on surface 67, and hence, $$\alpha_{pr}^{(95a)}=\alpha_{in}^{(1)}-\alpha_{sur2}. \quad (15)$$

As a result, the condition of Eq. (12) is fulfilled, and ray 95 is split by surface 93. Namely, part of the intensity of the light ray 95 is reflected from surface 93 as ray 95*a* having an off-axis angle of $\alpha_{in}^{(0)}$, and hence, is coupled out from the substrate 83 through the lower surface 72. In the other part, the intensity of the light ray 95 passes through surface 93 as ray 95*b* and continues to propagate inside the substrate 83, having the same off-axis angle of $\alpha_{in}^{(1)}$. After one reflection from the upper major surface 70, ray 95*b* impinges again on surface 93. Now, the ray impinges on the surface from the left side, and it behaves similarly to the ray that impinges on surface 67, and hence, $$\alpha_{pr}^{(95b)}=\alpha_{in}^{(1)}+\alpha_{sur2}. \quad (16)$$

As a result, the condition of Eq. (13) is fulfilled, and ray 95*b* is totally reflected from surface 93 and continues to propagate inside the substrate 83, having the off-axis angle of $$\alpha_{in}^{(1)}+2\cdot\alpha_{sur2}=\alpha_{in}^{(2)}. \quad (17)$$

Specifically, ray 95*b* propagates inside the substrate 83, having the second order off-axis angle of $\alpha_{in}^{(2)}$. After two reflections from the coupling-out surface 67, ray 95*b* is coupled out from substrate 83, having the same off-axis angle $\alpha_{in}^{(0)}$ as ray 95*a*.

As also illustrated in FIG. 9, another ray 96 (solid line) is coupled into the substrate 83 after two reflections from surface 67, and hence, propagates inside the substrate having the second order off-axis angle of $\alpha_{in}^{(2)}$. After a few reflections from the major surfaces of the substrate 83, ray 96 impinges on surface 93. Since the ray impinges on the surface from the left side and behaves in a similar manner to the rays that impinge on surface 67, hence, $$\alpha_{pr}^{(96a)}=\alpha_{in}^{(2)}-\alpha_{sur2}=\alpha_{in}^{(1)}+\alpha_{sur2}. \quad (18)$$

As a result, the condition of Eq. (13) is fulfilled, and ray 96 is totally reflected from surface 93 and continues to propagate inside the substrate 83, having an off-axis angle of $$\alpha_{in}^{(2)}-2\cdot\alpha_{sur2}=\alpha_{in}^{(1)}. \quad (19)$$

Specifically, ray 96 propagates inside the substrate 83, having the first order off-axis angle of $\alpha_{in}^{(1)}$. After one reflection from the lower major surface 72 of the substrate 83, the ray 96 impinges again on surface 93. Similar to the behavior of ray 95, ray 96 is split by surface 93. A part of the intensity of the light ray 96 is reflected from surface 93 as ray 96*a* having an off-axis angle of $\alpha_{in}^{(0)}$, and hence, is coupled out from the substrate 83 through the lower surface 70. The other part of the intensity of the light ray 96 passes through surface 93 as ray 96*b* and continues to propagate inside the substrate 83, having the same off-axis angle of $\alpha_{in}^{(1)}$. After one reflection from the coupling-out surface 67, ray 96*b* is coupled out from substrate 83, having the same off-axis angle $\alpha_{in}^{(0)}$ as rays 95*a*, 95*b*, and 96*a*. As a result, the output aperture of substrate 83 is the combination of surfaces 93 and 67. Consequently, the practical active area of the output aperture of substrate 83 has been doubled compared to that of substrate 83, which is illustrated in FIGS. 8A, 8B and 8C, while the thickness of the substrate remains the same. On the other hand, the brightness of light waves coupled out from substrate 83 has been reduced by the reflectivity of surface 93.

FIG. 10 illustrates another embodiment according to the present invention. Here, the coupled-out image projected into the viewer's eye is not oriented normal to the substrate major plane but rather inclined at an angle $\alpha_{inc}$. Such a configuration can be utilized in applications wherein it is required that the image be located out of the viewer's boresight. That is, the image is translated upward or sideward for top-down and eyeglasses configurations, respectively. An alternative utilization can be in top-down configurations where the image is located at the viewer's boresight, but the substrate is rotated at an angle $\alpha_{inc}$ to reduce the eye-relief of the system and at the same time to keep the substrate upper edge afar from the user's forehead.

The embodiment shown in FIG. 10 has the following parameters: $\alpha_{sur2}$=12.5°; the refractive index of the substrate is 2.0, and hence, $\alpha_{cr}$=30°; the zero-order incident angles $\alpha_{in}^{(0)}$(min), $\alpha_{in}^{(0)}$(mid) and $\alpha_{in}^{(0)}$(max), are 10°, 20°, and 30° in the air, and consequently are 5°, 9.8°, and 14.5° inside the substrate; the first order incident angles $\alpha_{in}^{(1)}$(min), $\alpha_{in}^{(1)}$(mid) and $\alpha_{in}^{(1)}$(max), are 30°, 34.8°, and 39.5°, and the second order incident angles $\alpha_{in}^{(2)}$(min), $\alpha_{in}^{(2)}$(mid) and $\alpha_{in}^{(2)}$(max), are 55°, 59.8°, and 64.5° respectively. For all the coupled light waves in the substrate the condition of Eq. (4) is fulfilled. As shown, three rays from the two marginal and the central light waves of the image are coupled out from the substrate into the center of the output pupil 90. The light rays 97L, 97M, and 97R, having incident angles which are the minimal, central and maximal angles in the FOV, respectively, are coupled out from the left, the center, and the right parts of the coupling-out surface 67, respectively. While rays 97M and 97L are coupled out after two reflections, ray 97R is coupled out after a single reflection from surface 67. Since Eq. (4) is satisfied for the entire FOV, ghost-images and gaps are avoided. In addition, since $\alpha_{in}^{(1)} \geq \alpha_{cr}$, and $\alpha_{in}^{(0)} < \alpha_{cr}$ for the entire FOV, the light waves from the entire FOV can be reflected in the direction of the output pupil 90 from the coupling-out surface 67, without using the redirecting element 79.

FIG. 9 illustrates a method to expand the output aperture of the substrate, along the propagation direction ζ, by embedding a partially reflective surface 93 inside the substrate 83. The output aperture can be further expanded along the ζ axis by embedding more partially reflecting surfaces inside the substrate. In many applications, it is required to expand the aperture also along the orthogonal axis η.

FIG. 11 illustrates how to expand the beam along two axes utilizing a double substrate configuration. The input wave 110 is coupled into the first substrate, 120*a*, which has a structure similar to that illustrated in FIG. 9, by the first reflecting surface 116*a* and then propagates along the η axis. The partially reflecting surfaces 122*a* couple the light out of substrate 120*a*, and then the light is coupled into the second substrate 120*b* by the reflecting surface 116*b*. The light then propagates along the axis and is coupled out by the partially reflecting surfaces 122*b*. As shown, the original beam 110 is expanded along both axes, η and ζ, where the overall expansion is determined by the ratio between the lateral dimensions of the elements 116*a* and 122*b*.

To find the proper configuration for the lateral expansion of the input light waves, it is important to note that the lateral expander 120*a* does not necessarily have to be partially transparent, as would the main substrate 120*b* have to be in the case of see-through applications.

FIG. 12 illustrates a modified version of FIG. 9. As shown, surface 116*a* here is a partially reflecting surface which also satisfies the conditions of Eqs. (12) and (13). As a result, the output aperture of substrate 83 is the combination of surfaces 116*a*, 122*a*1, and 112*a*2. Consequently, the practical active area of the output aperture of substrate 120*b* along the η axis has been tripled as compared to an embodiment that uses only a single substrate. The reflectance of surfaces 116*a*, 122*a*1 and 112*a*2 for incident angles that satisfy Eq. (12) should be set to achieve a uniform image along the η aperture axis. For the configuration illustrated in FIG. 12, the reflectance of these surfaces for incident angles that satisfy Eq. (12) should be 67%, 50%, and 100%, respectively (that is, surface 112*a*2 can be a simple mirror). As a result, the brightness efficiency of the lateral expander 120*a* is around 33%.

FIG. 13 illustrates a lateral expander wherein the brightness of the output light waves is increased on account of the lateral expansion. As shown, only two surfaces are embedded inside substrate 120*a*, a partially reflecting coupling-in surface 116*a*, which satisfies the conditions of Eqs. (12) (with a reflectance of 50%) and (13), and a reflecting coupling-out element 122*a*. Here, the brightness efficiency of element 120*a* is increased to 50%, and the expansion along the η axis is reduced to a factor of 2.

In the system described in FIGS. 12 and 13, the light from the display source is coupled into the substrate at the end of the substrate. There are, however, systems where it is preferred to have a symmetric system, namely, the input light should be coupled into the substrate at the central part of the substrate.

FIG. 14 illustrates a method for combining two identical substrates as in FIG. 13, which are joined to produce a symmetric optical module 124. As can be seen, part of the light from the display source (not shown) passes directly through the partially reflecting surfaces out of the substrate. The other parts of the light are coupled into the right 120R and the left 120L fractions of the substrate by the partially reflecting surfaces 116R and 116L, respectively. The trapped light is then coupled out by the reflecting surfaces 122R and 122L, respectively. The output aperture is twice the size of the input aperture of the system, the same magnification as described in FIG. 13. Unlike this system, however, the system in FIG. 14 is symmetric about the central line 125. Module 124 can be constructed as a combination of two identical substrates 120R and 120L, illustrated in FIG. 13, which are optically attached at the edges 123 of the substrates. The module can also be constructed of an isosceles triangular prism 126M, optically cemented to two identical parallelepipeds 126R and 126L.

In addition to the preferable external shape of the optical system illustrated in FIG. 14, the symmetric configuration has other advantages over the system illustrated in FIGS. 12 and 13. In considering the viewing angles, it is noted that different sections of the resulting image emerge from different areas of the coupling-out elements. As illustrated in FIG. 15, a single plane wave 127, representing a particular viewing angle 128, emerges from the output pupil 90 and illuminates only part 129 of the overall array of coupling-out elements 122*a*.

FIG. 16 illustrates how this viewing-angles analysis can simplify the optical design of a symmetric substrate. From examination of the input plane wave 133, which emerges from the right side of the display source, it is apparent that only the right part of the wave 133R, which is partially coupled into the right portion 120R, arrives at the output pupil 90 of the system. In contrast, the left part of the wave 133L, which is coupled into the left LOE 20L, does not arrive at the output pupil. Similarly, only the left part 134L of wave 134 emerging from the left side of the display source, arrives at the output pupil, whereas the right side of wave 134R does not.

There are two main consequences for this phenomenon. The first outcome is related to the symmetrical structure of the substrate. Assuming that the required FOV angle inside the substrate is $\alpha_{FOV}=\alpha_{max}-\alpha_{min}$. Hence, for an asymmetrical substrate, as illustrated in FIGS. 12 and 13, the maximal and the minimal angles of the trapped waves inside the substrate are $\alpha_{max}$ and $\alpha_{min}$, respectively. Therefore, the substrate should be designed to couple this angular range in and out. For the symmetric substrate illustrated in FIG. 17, however, it is evident that for the right portion 120R, only the lower part of the FOV 140RL is coupled into the output pupil of the system, while the higher part of the FOV 140RH is coupled outside of the output pupil and is not exploited by the viewer. Consequently, only the angular bandwidth between $\alpha_{min}$ and $$\alpha_{min}+\frac{\alpha_{FOV}}{2},$$

which is the lower half of the original FOV, is utilized by the right portion 120R. Similarly, only the low part of the FOV 140LL is utilized by the left facet 120L, and again, because of the symmetrical structure of the element, only the lower angular bandwidth between $$\alpha_{min}+\frac{\alpha_{FOV}}{2}$$

and $\alpha_{min}$, is exploited by the user here. Therefore, both portions 120R and 120L of the substrate are identical elements that must couple in and out waves having an identical FOV of $\alpha_{FOV}/2$. Since the FOV of the light waves, which are coupled inside each of the portions 120R and 120L, is half of the FOV coupled inside the substrate 120*a* in FIGS. 12 and 13, it will be much simpler now to verify that all the rays that encounter a double reflection from surfaces 116*a* and 122*a*, also satisfy the condition of Eq. (4). The design and the fabrication procedures of these two portions illustrated in FIG. 17 are much easier than those for a single substrate, as illustrated in FIGS. 12 and 13.

A similar consequence is related to the collimating lens 6. Since only the right half of the FOV is utilized by the right portion 120R, it can be deduced that this is the only relevant part of the FOV for the right part of the collimating lens 6R. Similarly, only the left part of the FOV is relevant to the left part of the collimating lens 6L. Therefore, a much simpler collimating lens can now be designed even for systems having a very wide FOV.

FIGS. 14 to 17 illustrate a method to expand the output aperture by a factor of two, however, there are systems mainly with wide FOV and large EMB, wherein more significant expansion ratios are required. It is possible to expand the output aperture using an approach similar to that illustrated in FIG. 12. The number of beamsplitters 122*ai* (i=1, 2, . . . ) inserted inside substrate 120*a* is not limited to one. A greater number of n beamsplitters yielding an expansion ratio of n+2 can be utilized, consequently reducing the output brightness by the same ratio. The main drawback of this approach, however, is that the FOV that can be coupled inside the substrate, is limited as a result of the asymmetrical structure of the substrate. In addition, the use of several different beamsplitters renders the embodiment complicated and challenging to manufacture.

FIG. 18 illustrates an alternative embodiment for increasing the expansion ratio utilizing two different substrates each having the same structure shown in FIG. 14. As illustrated, the optical module 144 comprises a main substrate 124M and a secondary substrate 124S, wherein the lateral dimensions of substrate 124M, along the ζ and η axes, are greater by a factor of 2 as compared to that of substrate 124S. Usually, the two substrates have the same lateral dimension along the ζ-axis. The output surface 72S of substrate 124S is positioned next to the input surface 70M of substrate 124M. The lateral extent of the incoming light waves along the η-axis is expanded by the factor of two by substrate 124S and then expanded again by a similar factor to an overall expansion of four. Consequently, the brightness of the output light waves is reduced by the same factor of four. Eventually, the approach illustrated in FIG. 18 is much simpler to materialize than that illustrated in FIG. 12, while it may contain a much wider FOV. The number of elements 124 which are combined to form the expanding device is not limited to two. A greater number of n different elements 124 can be joined to form an optical device having an expansion ratio of $2^n$.

FIGS. 8A, 8B, 8C to FIG. 18 illustrate various features which can be added to the basic configuration illustrated in FIG. 7, including: off-axis optical system (FIG. 10); single (FIGS. 8A, 8B and 8C), and multiple coupling-out elements (FIG. 9); asymmetrical (FIGS. 12 and 13) and symmetrical (FIGS. 14 to 18) lateral expansions, and devices comprise a single element (FIGS. 8A, 8B, 8C to FIG. 17) and multiple elements (FIG. 18). Eventually, any combination of any number of these features can be added together to the basic embodiment illustrated in FIG. 7, according to the specific requirements of the optical system.

FIG. 19 illustrates an optical device possessing a few of the characteristics described above. As shown, device 146 is an off-axis multi-stage beam expander that comprises three substrates 148A, 148B, and 148C. The lateral dimensions along the ζ-axis of substrates 148A and 148B are greater by a factor of two than that of substrate 148B and 148C, respectively. The output surfaces 72B and 72C of substrates 148B and 148C are located adjacent to the input surfaces 70A and 70B of substrates 148A and 148B, respectively. The lateral extent of the input light wave 150 is increased by a factor of eight by the device 146, while its brightness is reduced by the same factor.

As explained hereinabove, in all the embodiments illustrated in FIG. 7 to FIG. 19, it has been assumed that the coupled light rays inside the substrate must fulfill at least one of the two following requirements: they should be reflected not more than once from the coupling-in surface or, should satisfy the relation of Eq. (4). Otherwise, gaps and ghost images will be formed. There are optical systems, however, mainly those in which the FOV is extremely wide, wherein this requirement is difficult to achieve. Assuming an optical system having in the air a lateral FOV along the ζ-axis of 40° then, in the embodiments illustrated in FIGS. 7 and 8A, 8B and 8C, the slanted angle of the coupling-in surface is $\alpha_{sur2}=18°$ and the refractive index of the substrate is 2.0. The minimal angle of the FOV is $\alpha_{in}^{air}$ (min)=−20° in the air, and $\alpha_{in}^{0}=-9.8°$ inside the substrate. After a single reflection from the coupling-in element, the off-axis angle of the trapped rays inside the substrate is $$\alpha_{in}^{(1)}(\min)=\alpha_{in}^{(0)}(\min)+2\cdot\alpha_{sur2}=26.2°. \qquad (20)$$

This propagating angle is smaller than the critical angle $\alpha_{cr}=30°$, and hence, the light wave cannot be trapped inside the substrate by TIR. This problem can be solved for some optical systems by tilting the substrate, as illustrated in FIG. 10. The FOV that can be trapped inside an asymmetrical system is, however, usually limited. In addition, for symmetrical systems as shown in FIG. 16, the trapped FOV can be doubled, but this substrate cannot be tilted around its symmetry axis due to its symmetrical structure. As a result, to contain the entire FOV of 40°, the slanted angle of the coupling-in element should be increased at least to $\alpha_{sur2}=19.9°$.

The main problem of an embodiment having this slanted angle is that the requirement defined above to abort the undesired artifacts no longer exists. FIG. 20 illustrates the tracing backward (from the EMB to the input aperture) of a light ray 152 having an off-axis −16.1° in the air and −8° inside the substrate. The slanted angle of the coupling-in element is $\alpha_{sur2}=20°$. Since the light ray is located in a left segment of the FOV, it illuminates the left part of the coupling-out element 122, and consequently, is reflected twice from this surface before being coupled inside the substrate 120. The off-axis angle of the second-order propagating ray is $$\alpha_{in}^{(2)}=\alpha_{in}^{(0)}+4\cdot\alpha_{sur2}=72°. \qquad (21)$$

and therefore $$\alpha_{in}^{(2)}>90°-\alpha_{sur2}=70°, \qquad (22)$$

In other words, the condition of Eq. (4) is not fulfilled. As shown in FIG. 20, as a result of simultaneously fulfilling the two conditions stated above, the light ray incidents on the coupling-in element 116 from the lower surface 72 at a "wrong" direction. Subsequently, it is coupled out having a different off-axis angle than the incoming one. Since the "wrong" rays are initiated at the edge part of the coupling-out surface 122, a possible solution is to inactivate this part of the substrate.

FIGS. 21A and 21B illustrate methods to materialize this solution by mechanically removing, e.g., by cutting the substrate edges (FIG. 21A) or by blocking the edges of the coupling-out surfaces 112L, 122R (as shown in FIG. 21B) using mechanical blockers 127L, 127R, respectively.

The main problem of this proposed solution is that the inactivation of the edge part reduces the active area of the coupling-out surface. The exact reduction is usually determined by the FOV and the EMB of the device, but for most of the relevant systems, it is around 25%. That is to say, the usable area of the coupling-out surface is around 75% of its original size. For the embodiment illustrated in FIG. 14 the expansion ratio $A_r$ is $$A_r=\frac{S_{out}+S_{in}}{S_{in}}, \qquad (23)$$

wherein $S_{in}$ and $S_{out}$ are the active areas of the coupling-in and the coupling-out surfaces, respectively.

For a regular device, when the active areas of the two surfaces are equal, the expansion ratio is 2. For the modified devices of FIGS. 21A and 21B, this ratio is reduced to ~1.75. For some systems, this reduction is still acceptable, however, for systems having extremely big FOVs, the input aperture must be as small as possible. Moreover, a single expansion might not be enough for these systems, and a double or even a triple expansion, as illustrated in FIGS. 18 and 19, is required. In such cases, the partial inactivation of the coupling-out surfaces of the substrates will reduce the expansion ratio from 4 and 8 to 3 and 5.4, respectively.

A possible solution to the reduction problem is illustrated in FIGS. 22A and 22B. As a result of the partial inactivation of the coupling-out surface, along with the fulfillment of the condition given in Eq. 5, the edge part of the coupling-in surface also becomes unusable and can also be inactivated. As shown in FIG. 22A, the edge part of the coupling-in element is removed, like removing the edge of the coupling-out surface. The active areas of the coupling-in and the coupling-out surfaces of the truncated substrate 160 are now equal. FIG. 22B illustrates a symmetrical device 164 having the following parameters: the slanted angle is $\alpha_{sur2}=20°$, the FOV is 40°, and the substrate's refractive index is 2.0. The lateral dimension of the light waves over the entire FOV is expanded by a factor of two, without suffering from phenomena such as black stripes or ghost images. The module 164 can be constructed as a combination of two identical substrates 160R and 160L, illustrated in FIG. 22B, which are optically attached at the edges 123 of the substrates.

As shown in FIG. 22C, the module can also be constructed as a combination of two identical truncated parallelepipeds 166R and 166L, optically cemented to two different isosceles triangular prisms 167M and 167S.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Specifically, it should be noted that features described with reference to one or more embodiments are described by way of example rather than by way of limitation to those embodiments. Thus, unless stated otherwise or unless specific combinations are clearly inadmissible, optical features that are described with reference to only some embodiments are assumed to be likewise applicable also to all other embodiments.

The invention claimed is:

1. An optical device, comprising:

a first light-transmitting substrate having at least two parallel major surfaces;

a light wave input aperture;

a light wave output aperture positioned next to one of the major surfaces of the substrate;

a light wave output pupil;

a light wave input element for coupling light waves, having a first field-of-view and a central light wave, into the substrate to effect total internal reflection from the major surfaces of the substrate, and at least one reflecting surface having an active area and being located between the two major surfaces of the light-transmitting substrate, for coupling light waves out of the substrate, wherein the at least one reflecting surface is configured to have a critical angle relative to light waves coupled inside the substrate and is oriented inside the substrate so that light waves coupled inside the substrate are reflected at least a first and a second reflection by the active area of the at least one reflecting surface before being coupled out from the substrate, are substantially reflected from one of the major surfaces between a first and a second reflectance from the at least one reflecting surface, and are then reflected from the at least one reflecting surface and pass through the output aperture towards the output pupil, and the at least one reflecting surface is configured so that for the entire first field-of-view, incident angles of the coupled light waves at the at least one reflecting surface, are above the critical angle at the first reflection and below the critical angle at the second reflection.

2. The optical device according to claim 1, wherein the at least one reflecting surface is configured so that light waves coupled inside the substrate are totally reflected by the at least one reflecting surface at the first reflectance and light waves incident at a first reflecting surface at the second reflection are split by the at least one reflecting surface into two parts, a part of the light waves is coupled out from the first light-transmitting substrate towards the output pupil and another part passes through the first reflecting surface.

3. The optical device according to claim 1, wherein an optical adhesive having a refractive index lower than that of the light-transmitting substrate is applied at the at least one reflecting surface, and the critical angle is determined by a ratio between the refractive indices of the optical adhesive, and respectively, the substrate.

4. The optical device according to claim 3, wherein light waves coupled inside the substrate are reflected the same number of reflections from the input element and the at least one reflecting surface.

5. The optical device according to claim 4, wherein the input element is partially reflective for light waves arriving directly from the input aperture and totally reflective for light waves reflected once from the input element and once from one of the major surfaces of the substrate.

6. The optical device according to claim 3, further comprising a partially reflecting surface parallel to the at least one reflecting surface, wherein light waves coupled inside the substrate after two reflections from the input element are totally reflected by the partially reflecting surface at a first reflectance and are partially reflected from the partially reflecting surface at a second reflectance towards the output pupil.

7. The optical device according to claim 1, wherein light waves coupled inside the substrate are reflected at least a single time by the active area of the at least one reflecting surface before being coupled out from the substrate through the output aperture towards the output pupil.

8. The optical device according to claim 1, wherein the central wave is coupled-out from the substrate substantially normal to the major surfaces of the substrate.

9. The optical device according to claim 8, wherein light waves from the input aperture partially pass through the input surface towards the output aperture of the optical device.

10. The optical device according to claim 1, wherein the coupled light waves are collimated plane waves.

11. An optical device for transferring light waves, comprising:

a first light-transmitting substrate having at least two parallel major surfaces and at least one edge;

a light wave input aperture;

a light wave output aperture positioned next to one of the major surfaces of the substrate;

a light wave output pupil;

a light wave input surface for coupling light waves, having a first field-of-view and a central light wave, into the substrate to effect total internal reflection from the major surfaces of the substrate, and at least one reflecting surface having an active area and being located between the two major surfaces of the light-transmitting substrate, for coupling light waves out of the substrate, wherein the input surface is configured to have a critical angle relative to light waves coupled inside the substrate and is oriented inside the substrate so that light waves coupled into the substrate through the input aperture substantially normal to the major surfaces of the substrate, are reflected at least a first and a second reflection by the input surface before being coupled into the substrate and are substantially reflected from one of the major surfaces between a first and a second reflectance from the input surface, the input surface is configured so that for the entire first field-of-view, the incident angles of the coupled light waves at the input surface are below the critical angle at the first reflection and above the critical angle at the second reflection, and wherein light waves coupled inside the substrate are reflected at least twice by the active side of the at least one reflecting surface before being coupled out from the substrate through the output aperture substantially normal to the major surfaces of the substrate, and light waves passing through the input aperture substantially normal to the major surfaces of the substrate, are reflected once by the input surface before being coupled into the substrate.

12. The optical device according to claim 11, wherein an optical adhesive having a refractive index lower than that of the light-transmitting substrate is applied at the input surface, and the critical angle is determined by the ratio between the refractive indices of the optical adhesive, and respectively, the substrate.

13. The optical device according to claim 11, wherein light waves coupled inside the substrate are reflected at least twice by the active side of the at least one reflecting surface before being coupled out from the substrate through the output aperture substantially normal to the major surfaces of the substrate.

14. The optical device according to claim 13, further comprising:

a second light-transmitting substrate having at least two parallel major surfaces and at least one edge;

a second input surface for coupling light waves, having a second field-of-view, into the second substrate to effect total internal reflection from the major surfaces of the substrate, and at least one reflecting surface having an active area and being located between the two major surfaces of the second light-transmitting substrate, for coupling light waves out of the substrate, wherein light waves coupled into the second substrate from the input aperture substantially normal to the major surfaces of the substrate, are reflected at least twice by the second input surface before being coupled into the substrate and are substantially reflected from one of the major surfaces between the first and the second reflectance from the input surface, and the first and the second substrates are optically attached at the edges.

* * * * *